US012683740B2

(12) United States Patent
Zou et al.

(10) Patent No.: US 12,683,740 B2
(45) Date of Patent: Jul. 14, 2026

(54) PROPAGATION DELAY COMPENSATION

(71) Applicant: Telefonaktiebolaget LM Ericsson (publ), Stockholm (SE)

(72) Inventors: Zhenhua Zou, Solna (SE); Yufei Blankenship, Kildeer, IL (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 433 days.

(21) Appl. No.: 18/032,850

(22) PCT Filed: Oct. 21, 2021

(86) PCT No.: PCT/EP2021/079168
§ 371 (c)(1),
(2) Date: Apr. 20, 2023

(87) PCT Pub. No.: WO2022/084431
PCT Pub. Date: Apr. 28, 2022

(65) Prior Publication Data
US 2023/0327833 A1      Oct. 12, 2023

Related U.S. Application Data

(60) Provisional application No. 63/094,593, filed on Oct. 21, 2020.

(51) Int. Cl.
*H04L 5/00* (2006.01)
*H04W 76/20* (2018.01)

(52) U.S. Cl.
CPC ........... *H04L 5/0051* (2013.01); *H04W 76/20* (2018.02)

(58) Field of Classification Search
CPC ...... H04L 5/0051; H04W 76/20; H04W 64/00
See application file for complete search history.

(56) References Cited

U.S. PATENT DOCUMENTS

2021/0050978 A1* 2/2021 Manolakos ........... H04L 5/0051
2022/0039057 A1* 2/2022 Bao ....................... H04L 5/0048

OTHER PUBLICATIONS

International Search Report and Written Opinion issued in International Application No. PCT/EP2021/079168 dated Jan. 27, 2022 (11 pages).
Moderator (CATT), "FL Summary #4 for Potential Positioning Enhancements", 3GPP TSG RAN WG1 Meeting #102-e, R1-2007210, e-meeting May 25-Jun. 5, 2020 (108 pages).
LG Electronics, "Discussion on potential enhancements for NR positioning", 3GPP TSG RAN WG1 #103-e, R1-2008417, e-Meeting, Oct. 26-Nov. 13, 2020 (11 pages).

* cited by examiner

*Primary Examiner* — Jamal Javaid
(74) *Attorney, Agent, or Firm* — Rothwell, Figg, Ernst & Manbeck, P.C.

(57) ABSTRACT

A method (500) performed by a UE. The method includes the UE receiving a configuration message that comprises positioning reference signal (PRS) resource configuration information defining a PRS resource configuration. The method also includes the UE receiving a trigger message transmitted by a base station, the trigger message comprising information for identifying the PRS resource configuration. The method also includes, after receiving the trigger message, the UE receiving a PRS transmitted by the base station according to the PRS resource configuration, wherein The PRS is a semi-persistently or an a-periodically transmitted DL reference signal.

20 Claims, 10 Drawing Sheets

500

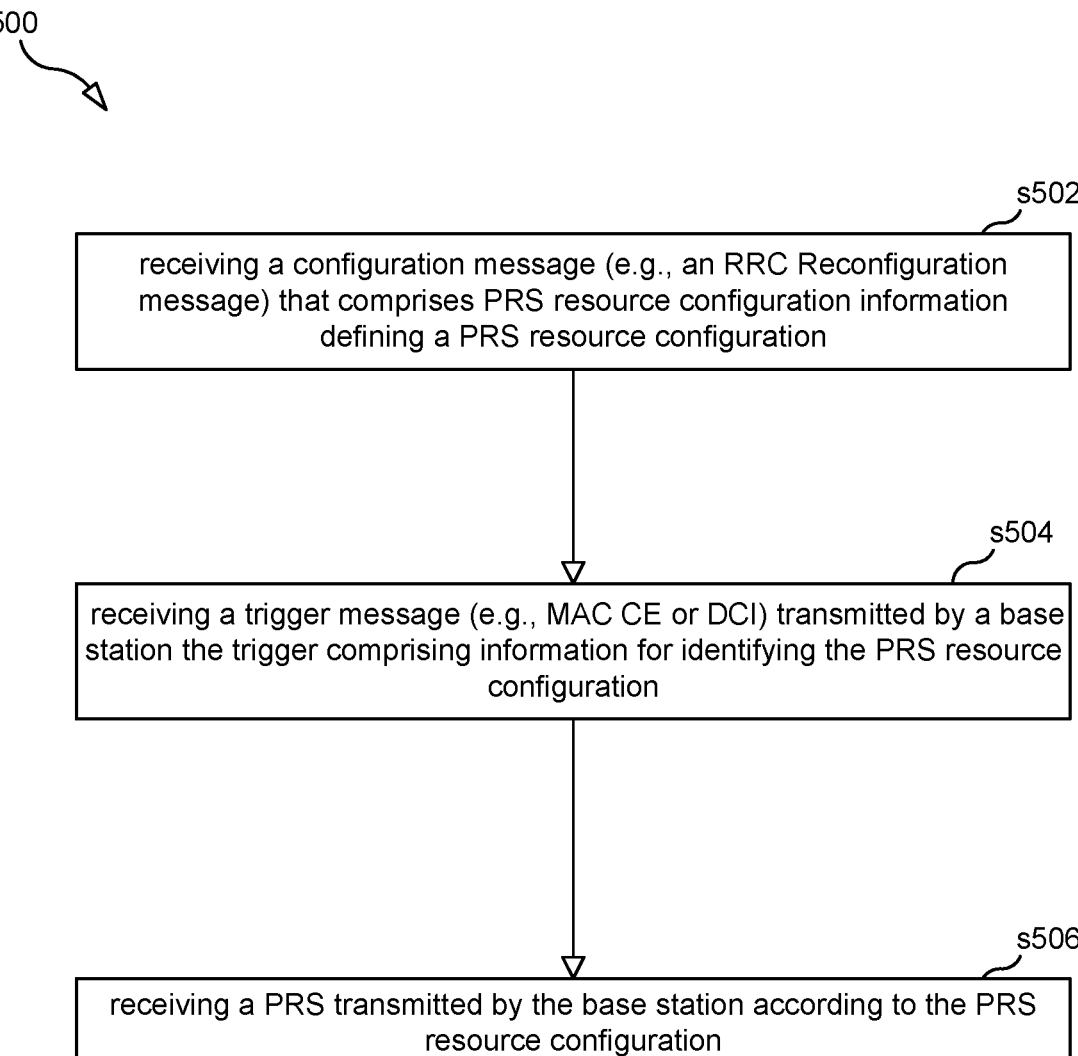

s502 receiving a configuration message (e.g., an RRC Reconfiguration message) that comprises PRS resource configuration information defining a PRS resource configuration s504 receiving a trigger message (e.g., MAC CE or DCI) transmitted by a base station the trigger comprising information for identifying the PRS resource configuration s506 receiving a PRS transmitted by the base station according to the PRS resource configuration

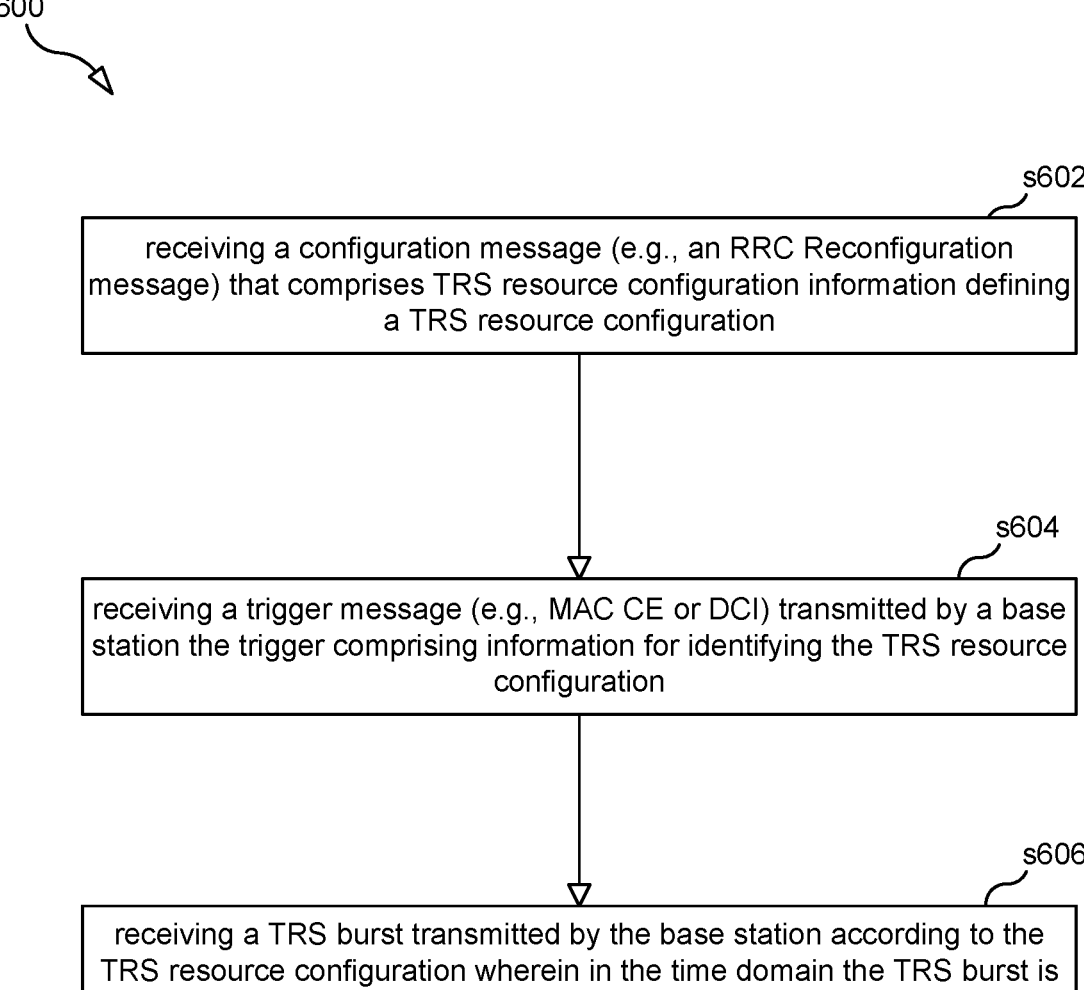

s602 receiving a configuration message (e.g., an RRC Reconfiguration message) that comprises TRS resource configuration information defining a TRS resource configuration s604 receiving a trigger message (e.g., MAC CE or DCI) transmitted by a base station the trigger comprising information for identifying the TRS resource configuration s606 receiving a TRS burst transmitted by the base station according to the TRS resource configuration wherein in the time domain the TRS burst is present during at least three different symbols of a first slot and/or in the frequency domain the TRS burst has a density of at least 4 for at least the first slot

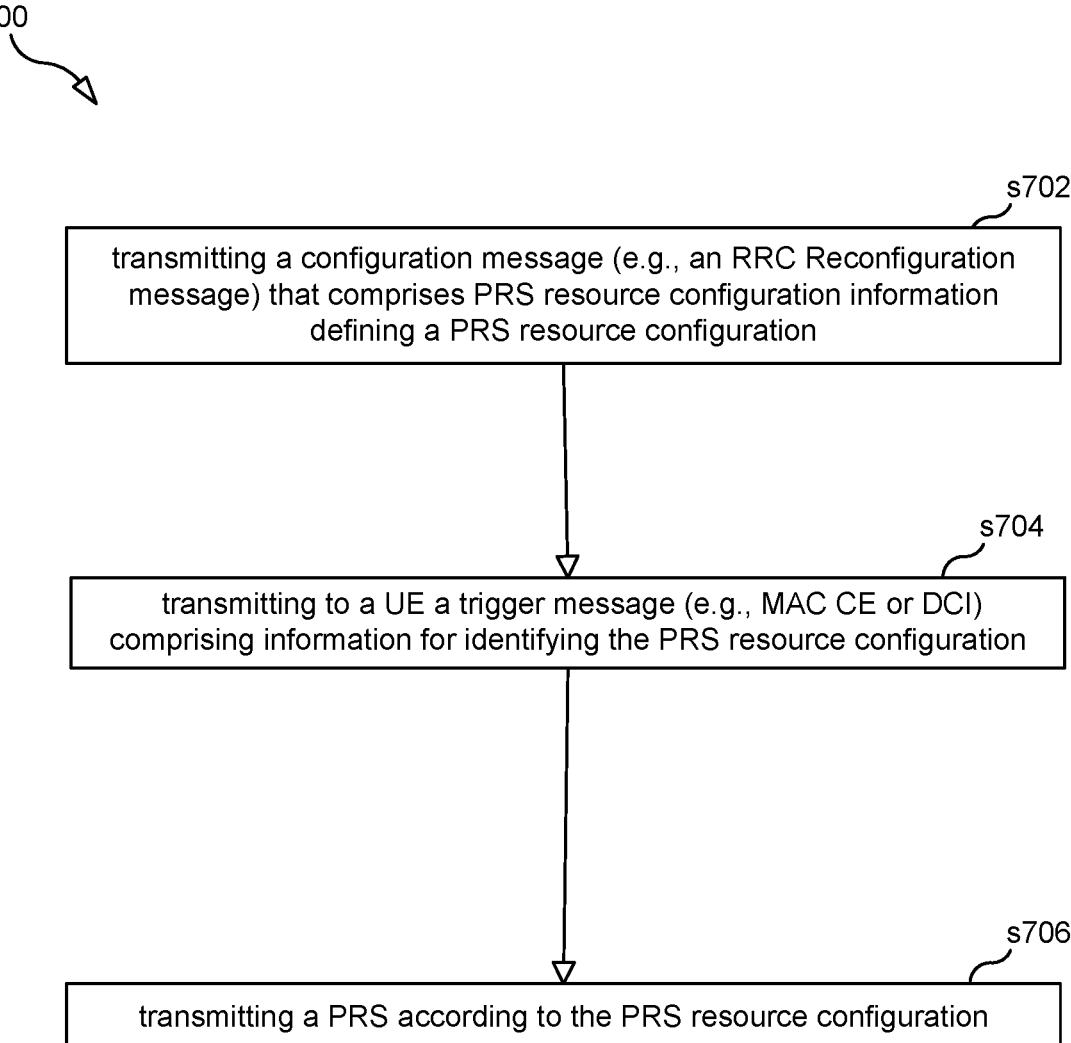

s702 transmitting a configuration message (e.g., an RRC Reconfiguration message) that comprises PRS resource configuration information defining a PRS resource configuration s704 transmitting to a UE a trigger message (e.g., MAC CE or DCI) comprising information for identifying the PRS resource configuration s706 transmitting a PRS according to the PRS resource configuration

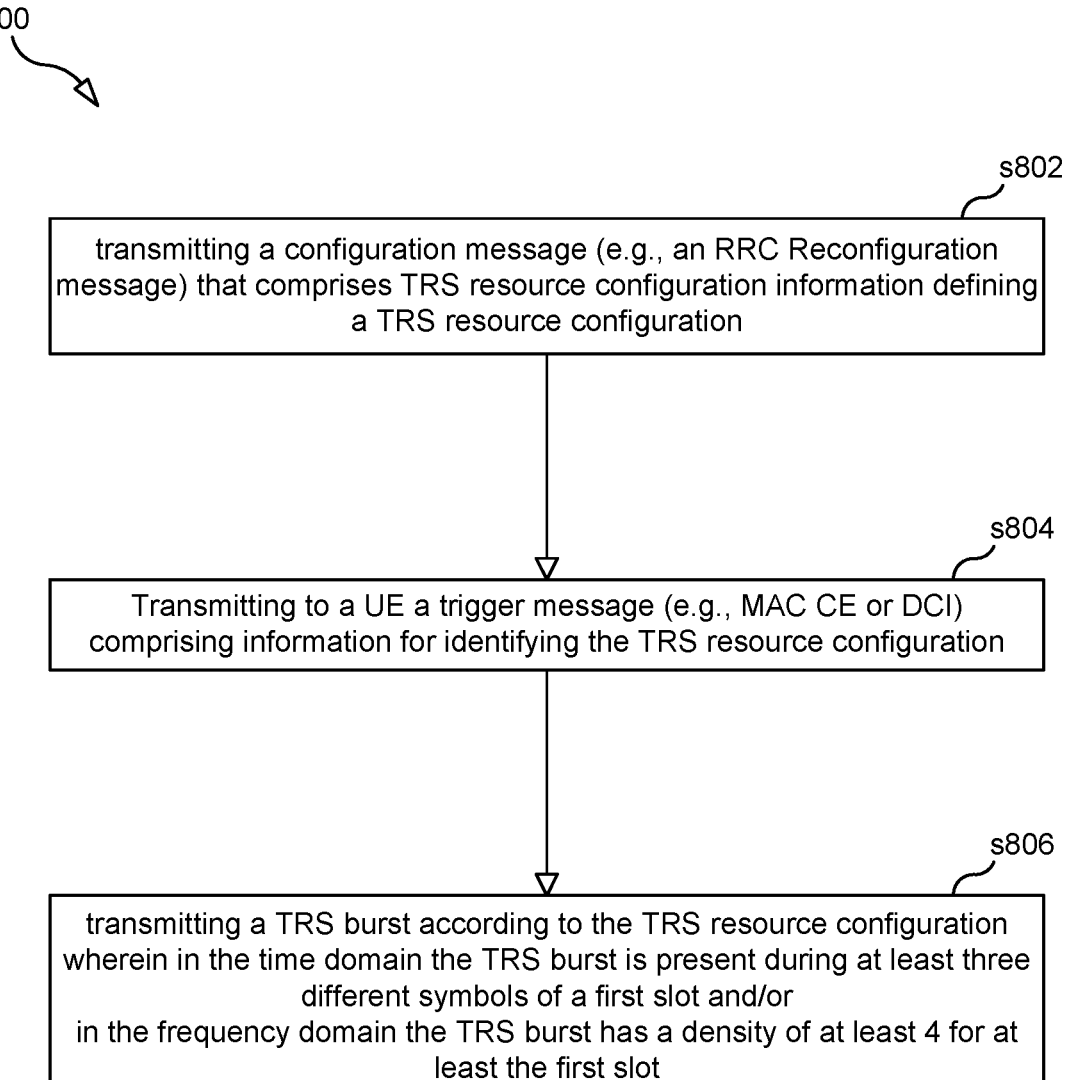

transmitting a configuration message (e.g., an RRC Reconfiguration message) that comprises TRS resource configuration information defining a TRS resource configuration s804

Transmitting to a UE a trigger message (e.g., MAC CE or DCI) comprising information for identifying the TRS resource configuration s806 transmitting a TRS burst according to the TRS resource configuration wherein in the time domain the TRS burst is present during at least three different symbols of a first slot and/or
in the frequency domain the TRS burst has a density of at least 4 for at least the first slot

FIG. 8

PROPAGATION DELAY COMPENSATION

CROSS REFERENCE TO RELATED APPLICATIONS

This application is a 35 U.S.C. § 371 National Stage of International Patent Application No. PCT/EP2021/079168, filed 2021 Oct. 21, which claims priority to U.S. provisional application No. 63/094,593, filed on 2020 Oct. 21, which is incorporated by this reference.

TECHNICAL FIELD

Disclosed are embodiments related to propagation delay compensation.

BACKGROUND

1. Current Third Generation Partnership Project (3GPP) Status

The 3GPP release 17 (Rel-17) radio access network (RAN) work item "Enhanced Industrial Internet of Things (IoT) and ultra-reliable and low latency communication (URLLC) support for New Radio (NR)" has the following objective related with propagation delay compensation: Enhancements for support of time synchronization:

a. RAN impacts of SA2 work on uplink time synchronization for Time Sensitive Networking (TSN), if any. [RAN2];

b. Propagation delay compensation enhancements (including mobility issues, if any). [RAN2, RAN1, RAN3, RAN4]."

It has been agreed that

The following options for propagation delay compensation are further studied in RAN1

Option 1: Timing Advance (TA) based propagation delay :

Option 1a: Propagation delay estimation based on legacy Timing advance (potentially with enhanced TA indication granularity).

Option 1b: Propagation delay estimation based on timing advanced enhanced for time synchronization (as 1a but with updated RAN4 requirements to TA adjustment error and Te)

Option 1c: Propagation delay estimation based on a new dedicated signaling with finer delay compensation granularity (Separated signaling from TA so that TA procedure is not affected)

Option 2: Round-Trip-Time (RTT) based delay compensation:

Propagation delay estimation based on an RAN managed RX-TX procedure intended for time synchronization.

The reference cell for reference time delivery is the Primary Cell (PCell). The reference time information sent on Radio Resource Control (RRC) contains a field that indicates the reference System Frame Number (SFN) corresponding to the reference time information. It is possible to have unaligned SFN across carriers in a cell group, and thus a reference cell is needed and defined in RRC that "If referenceTimeInfo field is received in DLInformationTransfer message, this field indicates the SFN of PCell." PSCell is not included as DLInformationTransfer is sent on SRB1/2 on the Master Cell Group (MCG) not on the Secondary Cell Group (SCG). Additionally, System Information Block 9 (SIB9) is only broadcasted on the PCell and this restriction aligns the RRC-dedicated and broadcast message for reference time delivery.

2. Multi-RTT Positioning Method

In the Multi-RTT positioning method, the UE position is estimated based on measurements performed at both UE and transmission and reception points (TRPs) (e.g., an antenna panel—a base station (such as a NR base station (gNB) has one or more TRPs). The measurements performed at the UE and TRPs are UE/gNB Rx-Tx time difference measurements (and optionally downlink (DL) positioning reference signal (PRS) reference signal received power (DL-PRS-RSRP) and uplink (UL) sound reference signal (SRS) RSRP (UL-SRS-RSRP)) of DL-PRS and UL-SRS, which are used by a Location Management Function (LMF) to determine the RTTs. Below is an example of NR base station (gNB) measurement for positioning.

The reporting range of gNB Rx-Tx time difference, as defined in Clause 5.2.3 of TS 38.215, is defined from $-985024T_c$ to $+985024 \times T_c$. The reporting resolution is uniform across the reporting range and is defined as $T = T_c * 2^k$ where k is selected by gNB from the set $\{0, 1, 2, 3, 4, 5\}$.

The LMF provides a recommended k value (k1). gNB selects parameter k (k2) and informs to the LMF.

The mapping of measured quantity for each reporting resolution (k) is defined in Table 13.2.1-1 to Table 13.2.1-6 of 3GPP TS 38.133 V16.4.0, which are shown below.

TABLE 13.2.1-1 gNB Rx-Tx time difference measurement report mapping for reporting resolution of $T_c$ (k = 0)

| Reported Value | Measured Quantity Value | Unit |
|---|---|---|
| RX-TX_0000 | −985024 > RX-TX | $T_c$ |
| RX-TX_0001 | −985024 ≤ RX-TX < −985023 | $T_c$ |
| RX-TX_0002 | −985023 ≤ RX-TX < −985022 | $T_c$ |
| . . . | . . . | . . . |
| RX-TX_985023 | −2 ≤ RX-TX < −1 | $T_c$ |
| RX-TX_985024 | −1 ≤ RX-TX ≤ 0 | $T_c$ |
| RX-TX_985025 | 0 < RX-TX ≤ 1 | $T_c$ |
| RX-TX_985026 | 1 < RX-TX ≤ 2 | $T_c$ |
| RX-TX_985027 | 2 < RX-TX ≤ 3 | $T_c$ |
| . . . | . . . | . . . |
| RX-TX_1970048 | 985023 < RX-TX ≤ 985024 | $T_c$ |
| RX-TX_1970049 | 985024 < RX-TX | $T_c$ |

TABLE 13.2.1-2 gNB Rx-Tx time difference measurement report mapping for reporting resolution of $2T_c$ (k = 1)

| Reported Value | Measured Quantity Value | Unit |
|---|---|---|
| RX-TX_0000 | −985024 > RX-TX | $T_c$ |
| RX-TX_0001 | −985024 ≤ RX-TX < −985022 | $T_c$ |
| RX-TX_0002 | −985022 ≤ RX-TX < −985020 | $T_c$ |
| . . . | . . . | . . . |
| RX-TX_492511 | −4 ≤ RX-TX < −2 | $T_c$ |
| RX-TX_492512 | −2 ≤ RX-TX ≤ 0 | $T_c$ |
| RX-TX_492513 | 0 < RX-TX ≤ 2 | $T_c$ |
| RX-TX_492514 | 2 < RX-TX ≤ 4 | $T_c$ |
| RX-TX_492515 | 4 < RX-TX ≤ 6 | $T_c$ |
| . . . | . . . | . . . |
| RX-TX_985024 | 985022 < RX-TX ≤ 985024 | $T_c$ |
| RX-TX_985025 | 985024 < RX-TX | $T_c$ |

TABLE 13.2.1-3 gNB Rx-Tx time difference measurement report
mapping for reporting resolution of $4T_c$ (k = 2)

| Reported Value | Measured Quantity Value | Unit |
|---|---|---|
| RX-TX_0000 | −985024 > RX-TX | $T_c$ |
| RX-TX_0001 | −985024 ≤ RX-TX < −985020 | $T_c$ |
| RX-TX_0002 | −985020 ≤ RX-TX < −985018 | $T_c$ |
| . . . | . . . | . . . |
| RX-TX_246255 | −8 ≤ RX-TX < −4 | $T_c$ |
| RX-TX_246256 | −4 ≤ RX-TX ≤ 0 | $T_c$ |
| RX-TX_246257 | 0 < RX-TX ≤ 4 | $T_c$ |
| RX-TX_246258 | 4 < RX-TX ≤ 8 | $T_c$ |
| RX-TX_246259 | 8 < RX-TX ≤ 12 | $T_c$ |
| . . . | . . . | . . . |
| RX-TX_492512 | 985020 < RX-TX ≤ 985024 | $T_c$ |
| RX-TX_492513 | 985024 < RX-TX | $T_c$ |

TABLE 13.2.1-4 gNB Rx-Tx time difference measurement report
mapping for reporting resolution of $8T_c$ (k = 3)

| Reported Value | Measured Quantity Value | Unit |
|---|---|---|
| RX-TX_0000 | −985024 > RX-TX | $T_c$ |
| RX-TX_0001 | −985024 ≤ RX-TX < −985016 | $T_c$ |
| RX-TX_0002 | −985016 ≤ RX-TX < −985008 | $T_c$ |
| . . . | . . . | . . . |
| RX-TX_123127 | −16 ≤ RX-TX < −8 | $T_c$ |
| RX-TX_123128 | −8 ≤ RX-TX ≤ 0 | $T_c$ |
| RX-TX_123129 | 0 < RX-TX ≤ 8 | $T_c$ |
| RX-TX_123130 | 8 < RX-TX ≤ 16 | $T_c$ |
| RX-TX_123131 | 16 < RX-TX ≤ 24 | $T_c$ |
| . . . | . . . | . . . |
| RX-TX_246256 | 985016 < RX-TX ≤ 985024 | $T_c$ |
| RX-TX_246257 | 985024 < RX-TX | $T_c$ |

TABLE 13.2.1-5 gNB Rx-Tx time difference measurement report
mapping for reporting resolution of $16T_c$ (k = 4)

| Reported Value | Measured Quantity Value | Unit |
|---|---|---|
| RX-TX_0000 | −985024 > RX-TX | $T_c$ |
| RX-TX_0001 | −985024 ≤ RX-TX < −985008 | $T_c$ |
| RX-TX_0002 | −985008 ≤ RX-TX < −984992 | $T_c$ |
| . . . | . . . | . . . |
| RX-TX_61563 | −32 ≤ RX-TX < −16 | $T_c$ |
| RX-TX_61564 | −16 ≤ RX-TX ≤ 0 | $T_c$ |
| RX-TX_61565 | 0 < RX-TX ≤ 16 | $T_c$ |
| RX-TX_61566 | 16 < RX-TX ≤ 32 | $T_c$ |
| RX-TX_61567 | 32 < RX-TX ≤ 48 | $T_c$ |
| . . . | . . . | . . . |
| RX-TX_123128 | 985008 < RX-TX ≤ 985024 | $T_c$ |
| RX-TX_123129 | 985024 < RX-TX | $T_c$ |

TABLE 13.2.1-6 gNB Rx-Tx time difference measurement report
mapping for reporting resolution of $32T_c$ (k = 5)

| Reported Value | Measured Quantity Value | Unit |
|---|---|---|
| RX-TX_0000 | −985024 > RX-TX | $T_c$ |
| RX-TX_0001 | −985024 ≤ RX-TX < −984992 | $T_c$ |
| RX-TX_0002 | −984992 ≤ RX-TX < −984960 | $T_c$ |
| . . . | . . . | . . . |
| RX-TX_30781 | −64 ≤ RX-TX < −32 | $T_c$ |
| RX-TX_30782 | −32 ≤ RX-TX ≤ 0 | $T_c$ |
| RX-TX_30783 | 0 < RX-TX ≤ 32 | $T_c$ |
| RX-TX_30784 | 32 < RX-TX ≤ 64 | $T_c$ |

TABLE 13.2.1-6-continued gNB Rx-Tx time difference measurement report
mapping for reporting resolution of $32T_c$ (k = 5)

| Reported Value | Measured Quantity Value | Unit |
|---|---|---|
| RX-TX_30785 | 64 < RX-TX ≤ 96 | $T_c$ |
| . . . | . . . | . . . |
| RX-TX_61564 | 984992 < RX-TX ≤ 985024 | $T_c$ |
| RX-TX_61565 | 985024 < RX-TX | $T_c$ |

3. Report Mapping

The reporting range of UL SRS RSRP, as defined in clause 5.2.5 of 38.215, is defined from −156 dBm to −31 dBm with resolution 1 dB. The mapping of measured quantity is defined in Table 13.3.1-1 of TS 38.133 (which is shown below). The range in the signalling may be larger than the guaranteed accuracy range.

TABLE 13.3.1-1

UL SRS RSRP report mapping

| Reported value | Measured quantity value | Unit |
|---|---|---|
| SRS_RSRP_0 | SRS-RSRP < −156 | dBm |
| SRS_RSRP_1 | −156 ≤ SRS-RSRP < −155 | dBm |
| SRS_RSRP_2 | −155 ≤ SRS-RSRP < −154 | dBm |
| SRS_RSRP_3 | −154 ≤ SRS-RSRP < −153 | dBm |
| SRS_RSRP_4 | −153 ≤ SRS-RSRP < −152 | dBm |
| SRS_RSRP_5 | −152 ≤ SRS-RSRP < −151 | dBm |
| SRS_RSRP_6 | −151 ≤ SRS-RSRP < −150 | dBm |
| SRS_RSRP_7 | −150 ≤ SRS-RSRP < −149 | dBm |
| SRS_RSRP_8 | −149 ≤ SRS-RSRP < −148 | dBm |
| SRS_RSRP_9 | −148 ≤ SRS-RSRP < −147 | dBm |
| SRS_RSRP_10 | −147 ≤ SRS-RSRP < −146 | dBm |
| SRS_RSRP_11 | −146 ≤ SRS-RSRP < −145 | dBm |
| SRS_RSRP_12 | −145 ≤ SRS-RSRP < −144 | dBm |
| SRS_RSRP_13 | −144 ≤ SRS-RSRP < −143 | dBm |
| SRS_RSRP_14 | −143 ≤ SRS-RSRP < −142 | dBm |
| SRS_RSRP_15 | −142 ≤ SRS-RSRP < −141 | dBm |
| SRS_RSRP_16 | −141 ≤ SRS-RSRP < −140 | dBm |
| SRS_RSRP_17 | −140 ≤ SRS-RSRP < −139 | dBm |
| SRS_RSRP_18 | −139 ≤ SRS-RSRP < −138 | dBm |
| . . . | . . . | . . . |
| SRS_RSRP_111 | −46 ≤ SRS-RSRP < −45 | dBm |
| SRS_RSRP_112 | −45 ≤ SRS-RSRP < −44 | dBm |
| SRS_RSRP_113 | −44 ≤ SRS-RSRP < −43 | dBm |
| SRS_RSRP_114 | −43 ≤ SRS-RSRP < −42 | dBm |
| SRS_RSRP_115 | −42 ≤ SRS-RSRP < −41 | dBm |
| SRS_RSRP_116 | −41 ≤ SRS-RSRP < −40 | dBm |
| SRS_RSRP_117 | −40 ≤ SRS-RSRP < −39 | dBm |
| SRS_RSRP_118 | −39 ≤ SRS-RSRP < −38 | dBm |
| SRS_RSRP_119 | −38 ≤ SRS-RSRP < −37 | dBm |
| SRS_RSRP_120 | −37 ≤ SRS-RSRP < −36 | dBm |
| SRS_RSRP_121 | −36 ≤ SRS-RSRP < −35 | dBm |
| SRS_RSRP_122 | −35 ≤ SRS-RSRP < −34 | dBm |
| SRS_RSRP_123 | −34 ≤ SRS-RSRP < −33 | dBm |
| SRS_RSRP_124 | −33 ≤ SRS-RSRP < −32 | dBm |
| SRS_RSRP_125 | −32 ≤ SRS-RSRP < −31 | dBm |
| SRS_RSRP_126 | −31 ≤ SRS-RSRP | dBm |

SUMMARY

Certain challenges presently exist. For instance, although the principle of the propagation delay compensation method is the same as the Timing Advance (TA) for uplink timing alignment and Round-Trip-Time (RTT) for positioning, the reference signals to support legacy TA (with accuracy not sufficient) and legacy RTT for positioning (with special functions to support positioning, e.g., interaction with a positioning server and multiple gNBs) are not suitable for propagation delay compensation.

Accordingly, in one aspect there is provided a method performed by a UE. The method includes the UE receiving a configuration message that comprises positioning reference signal (PRS) resource configuration information defining a PRS resource configuration. The method also includes the UE receiving a trigger message transmitted by a base station, the trigger message comprising information for identifying the PRS resource configuration. The method also includes, after receiving the trigger message, the UE receiving a PRS transmitted by the base station according to the PRS resource configuration, wherein The PRS is a semi-persistently or an a-periodically transmitted DL reference signal.

In another aspect there is provided a method performed by a UE. The method includes the UE receiving a configuration message that comprises tracking reference signal (TRS) resource configuration information defining a TRS resource configuration. The method also includes the UE receiving a trigger message transmitted by a base station, the trigger message comprising information for identifying the TRS resource configuration. The method also includes, after receiving the trigger message, the UE receiving a TRS burst transmitted by the base station according to the TRS resource configuration, wherein in the time domain, the TRS burst is present during at least three different symbols of a first slot, and/or in the frequency domain, the TRS burst has a density of at least 4 for at least the first slot.

In another aspect there is provided a computer program comprising instructions which when executed by processing circuitry of a UE causes the UE to perform the above described UE methods. In one embodiment, there is provided a carrier containing the computer program wherein the carrier is one of an electronic signal, an optical signal, a radio signal, and a computer readable storage medium.

In another aspect there is provided a UE that is configured to perform the above described method. The UE may include memory and processing circuitry coupled to the memory.

In another aspect there is provided a method performed by a base station. The method includes transmitting to a UE a configuration message that comprises PRS resource configuration information defining a PRS resource configuration. The method also includes transmitting to the UE a trigger message, the trigger message comprising information for identifying the PRS resource configuration. The method also includes, after transmitting the trigger message, transmitting a PRS according to the PRS resource configuration, wherein the PRS is a semi-persistently or an a-periodically transmitted DL reference signal.

In another aspect there is provided a method performed by a base station. The method includes transmitting to a UE a configuration message that comprises TRS resource configuration information defining a TRS resource configuration. The method also includes transmitting to the UE a trigger message, the trigger message comprising information for identifying the TRS resource configuration. The method also includes, after transmitting the trigger message, transmitting a TRS burst according to the TRS resource configuration, wherein in the time domain, the TRS burst is present during at least three different symbols of a first slot, and/or in the frequency domain, the TRS burst has a density of at least 4 for at least the first slot.

In another aspect there is provided a computer program comprising instructions which when executed by processing circuitry of a base station causes the base station to perform the above described base station methods. In one embodiment, there is provided a carrier containing the computer program wherein the carrier is one of an electronic signal, an optical signal, a radio signal, and a computer readable storage medium.

In another aspect there is provided a base station that is configured to perform the above described method. The base station may include memory and processing circuitry coupled to the memory.

An advantage of the embodiments disclosed herein is that they enable the propagation delay between the UE and the base station to be accurately estimated with multiple sources of the downlink reference signals (e.g., PRS, TRS) and more radio resources for each type of the reference signal. Additionally, the signaling overhead to transmit these reference signals is limited by introducing explicit network triggering for these reference signals.

BRIEF DESCRIPTION OF THE DRAWINGS

The accompanying drawings, which are incorporated herein and form part of the specification, illustrate various embodiments.

FIG. 5 is a flowchart illustrating a process according to some embodiments.

FIG. 6 is a flowchart illustrating a process according to some embodiments.

FIG. 7 is a flowchart illustrating a process according to some embodiments.

FIG. 8 is a flowchart illustrating a process according to some embodiments.

DETAILED DESCRIPTION

The legacy multi-RTT positioning method makes use of the UE Rx-Tx time difference measurements and downlink (DL) positioning reference signal (PRS) Reference Signal Received Power (RSRP) of downlink signals received from multiple TRPs measured by the UE, and the measured gNB Rx-Tx time difference measurements and UL-SRS-RSRP at multiple TRPs of uplink signals transmitted from UE. The measurements are used to determine the RTT at the positioning server which are used to estimate the location of the UE.

Figure 1:
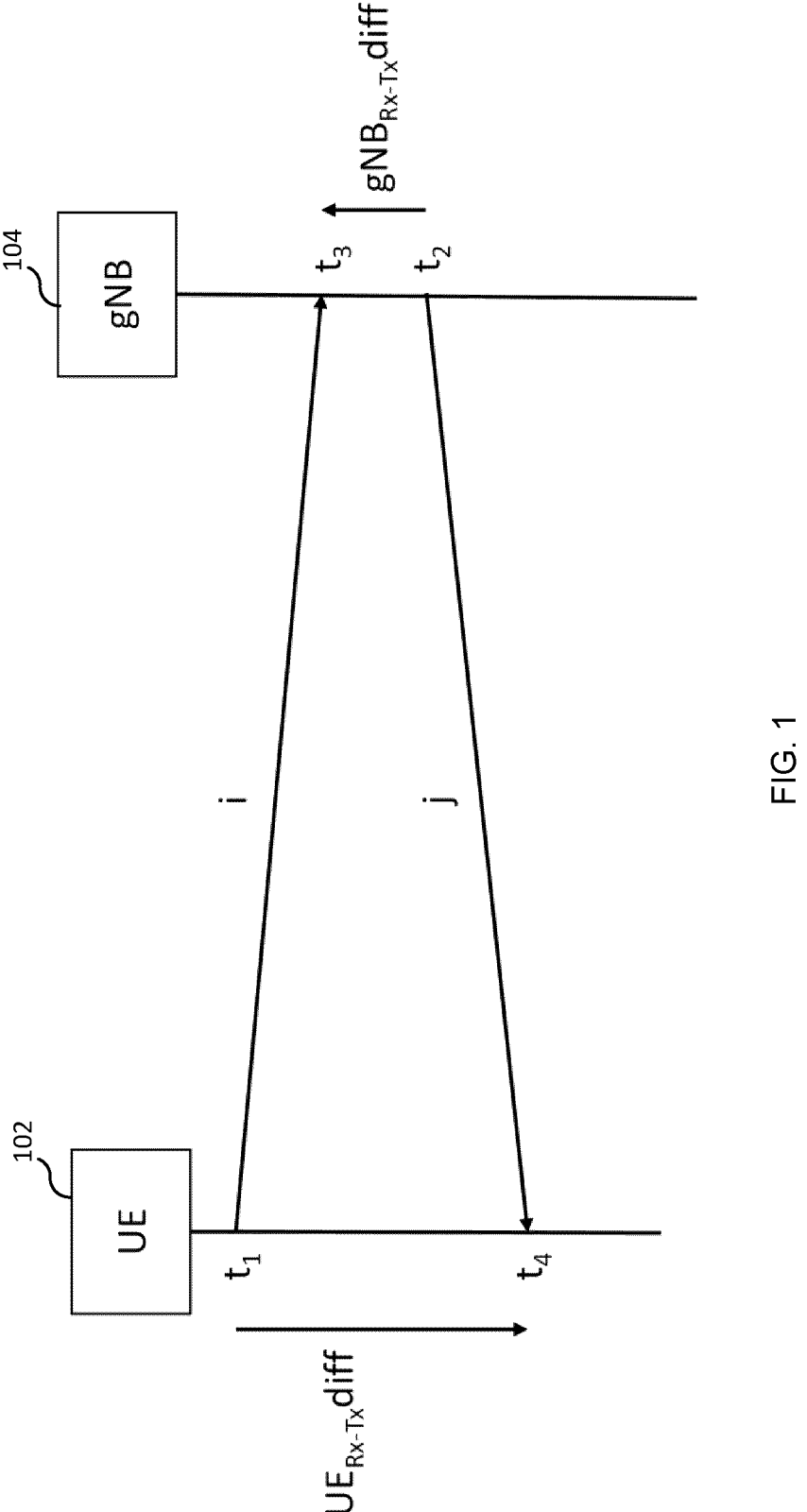
FIG. 1 is a message flow diagram illustrating a process for determining RTT.

The RTT based delay compensation is leveraged on the legacy multi-RTT positioning method illustrated in FIG. 1. As shown in FIG. 1, the user equipment (UE) 102 (which can be any device capable of wirelessly communicating with a base station) transmits an uplink frame i and records the transmission time as $t_1$. The base station (gNB) 104 receives uplink frame i and records the time of arrival of the first detected path as $t_3$. Next, the gNB transmits a downlink frame j to the UE, and records transmission time as $t_2$. Next, the UE receives downlink frame j and records the time of arrival of the first detected path as t. The following calculations are performed in the UE and gNB, respectively: i) $UE_{Rx-Tx}diff=t_4-t_1$; and ii) $gNB_{Rx-Tx}diff=t_3-t_2$. This quantity can be positive or negative depending on the whether gNB transmits the DL frame before or after receiving the UL frame. The propagation delay can be calculated as follows: RTT=gNB$_{Rx-Tx}$diff+UE$_{Rx-Tx}$diff.

1. Downlink Reference Signal for UE Measurement of Time Synchronization: Positioning Reference Signals (PRS)

1.1. Configuration of PRS

The positioning reference signals (PRS) from gNB are used for UE measurement of time synchronization. Consequently, the below set of RRC parameters is configured and sent from gNB to UE, instead of from location server to UE (specified in TS 37.355, LPP, v16.1.0).

In one example, the configuration is per serving cell and specific for each UE. The IE nr-DL-PRS-InfoPerTRP (details shown below) is added in the IE ServingCellConfig. The IE ServingCellConfig is used in the IE CellGroupConfig, which is transmitted in the RRC message RRCReconfiguration. A portion of the ServingCellConfig IE is shown below, which illustrates that the ServingCellConfig IE may contain multiple nr-DL-PRS-InfoPerTRP IEs:

```
ServingCellConfig ::=          SEQUENCE {
    ...
    nr-DL-PRS-InfoPerTRP-AddModList SEQUENCE (SIZE (1..nrMaxTrpPerCell)) of nr-DL-
PRS-InfoPerTRP
}
```

In another example, the configuration is common for all UEs within one cell. This can be useful in the case that all UEs in the cell need reference time delivery and the time is boardcast-ed in SIB9 (System Information 9). In this case, the IE nr-DL-PRS-InfoPerTRP-AddModList is added in the ServingCellConfigCommon IE, a portion of which is shown below:

```
ServingCellConfigCommon ::=          SEQUENCE {
...
    nr-DL-PRS-InfoPerTRP-AddModList SEQUENCE (SIZE (1..nrMaxTrpPerCell)) of NR-
DL-PRS-InfoPerTRP
}
```

In LPP, one location server is connected to multiple gNBs and UE measures multiple DL PRS from different gNBs. UE measurement reports are sent on the higher layer using LPP protocol (i.e., the message is transparent to gNB). There is a need to add the global PRS-configuration ID within one location server for each UE. In this way, the location server can link the measurement reporting to the gNB (or cell) and the associated PRS configuration.

In LPP, the information element (IE) DL-PRS-ID-Info (shown in the able below) provides the IDs of the reference TRPs' DL-PRS Resources.

```
DL-PRS-ID-Info ::= SEQUENCE {
    dl-PRS-ID                INTEGER (0..255),
    nr-DL-PRS-ResourceID-List   SEQUENCE (SIZE
    (1..nrMaxResource IDs)) OF
                        NR-DL-PRS-ResourceID
    OPTIONAL,
    nr-DL-PRS-ResourceSetID    NR-DL-PRS-ResourceSetID
        OPTIONAL
}
```

On the other hand, for PRS configuration for UE measurement of time synchronization, when reporting in the UL to the gNB, there is no need for this global ID. The UE needs to report the measurement report together with an IE SerCellIndex which is configured together with IW ServingCellRonfig in either IE SpCellConfig or IE SCellConfig. In other words, the above DL-PRS-ID-Info in LPP protocol is not needed on RRC.

In one example, the PRS may only be present in the SpCell (PCell in MCG or PSCell in SCG), since the time in the reference time delivery message refers to the SFN in PCell (if sent on MCG) or PSCell (if sent on SCG). The IF NR-DL-PRS-InfoPerTRP can then be added in the SpCellConfig IE as shown below:

```
SpCellConfig ::= SEQUENCE {
    servCellIndex ServCellIndex OPT, -- Cond SCG
    reconfigurationWithSync ReconfigurationWithSync OPT,- Cond
ReconfWithSync
    rlf-TimersAndConstants    SetupRelease { RLF-TimersAndConstants
}OPT -Need M
```

-continued

```
    rlmInSyncOutOfSyncThreshold ENUMERATED {n1} OPT,-- Need S
    spCellConfigDedicated ServingCellConfig OPT,-- Need M
    ...
    nr-DL-PRS-InfoPerTRP SEQUENCE(SIZE(1..nrMaxTrpPerCell)) of
```

-continued

```
NR-DL-PRS-InfoPerTRP
}
```

The IF nr-DL-PRS-InfoPerTRP (shown in the table below) defines downlink PRS configuration per TRP, which is a component of a base station. For factory automation in which the reference time is delivered, a cell can be served by multiple TRPs so that diversity gain is achieved to meet ultra-reliability and low latency requirement. Each TRP can be located in distinct coordinates and, thus, it is needed to configure the PRS per TRP.

```
-- ASN1START
NR-DL-PRS-InfoPerTRP ::= SEQUENCE {
    nr-DL-PRS-InfoPerTRP-ID      INTEGER (0:nrMaxTrpPerCell-1)
    nr-DL-PRS-ResourceSetAddModList SEQUENCE(SIZE(1..
    nrMaxSetsPerTrp))
                        OF NR-DL-PRS-ResourceSet,
    ...
}
NR-DL-PRS-ResourceSet ::= SEQUENCE {
    nr-DL-PRS-ResourceSetID      NR-DL-PRS-ResourceSetID,
    nr-DL-PRS-ResourceSetID-PerMAC NR-DL-PRS-ResourceSetID-
    PerMAC,
    dl-PRS-Periodicity-and-ResourceSetSlotOffset
```

```
            NR-DL-PRS-Periodicity-and-ResourceSetSlotOffset,
            OPTIONAL, -- Cond PeriodicOrSemiPersistent
    dl-PRS-ResourceRepetitionFactor ENUMERATED {n2, n4, n6, n8,
                        n16, n32, ...}OPT -- Need S
    dl-PRS-ResourceTimeGap ENUMERATED {s1, s2, s4, s8, s16, s32,
            ...}
                        OPTIONAL, -- Cond Rep
    dl-PRS-NumSymbols       ENUMERATED {n2, n4, n6, n12, ...},
    dl-PRS-MutingOption1    DL-PRS-MutingOption1 OPT, -- Need S
    dl-PRS-MutingOption2    DL-PRS-MutingOption2 OPT, -- Need S
    dl-PRS-ResourcePower    INTEGER (-60..50),
    dl-PRS-ResourceList     SEQUENCE (SIZE (1..
                        nrMaxResourcesPerSet)) OF NR-DL-
                        PRS-Resource,
    resourceType            ENUMERATED { aperiodic,
                        semiPersistent, periodic },
    durationForSemiPersistent ENUMERATED {n1, n2, n4, n8, n16, Inf}
                        OPT -- Cond SemiPersistent
}
DL-PRS-MutingOption1 ::= SEQUENCE {
    dl-prs-MutingBitRepetitionFactor
                        ENUMERATED { n1, n2, n4, n8, ... }
                        OPTIONAL,
    -- Need S
    nr-option1-muting           NR-MutingPattern,
    ...
}
DL-PRS-MutingOption2 ::= SEQUENCE {
    nr-option2-muting           NR-MutingPattern,
    ...
}
NR-MutingPattern ::= CHOICE {
    po2     BIT STRING (SIZE(2)),
    po4     BIT STRING (SIZE(4)),
    po6     BIT STRING (SIZE(6)),
    po8     BIT STRING (SIZE(8)),
    po16    BIT STRING (SIZE(16)),
    po32    BIT STRING (SIZE(32)),
    ...
}
NR-DL-PRS-Resource ::= SEQUENCE {
    nr-DL-PRS-ResourceID   NR-DL-PRS-ResourceID,
    dl-PRS-SequenceID   INTEGER (0.. 4095),
    dl-PRS-CombSizeN-AndReOffset CHOICE {
    n2  INTEGER (0..1),
    n4  INTEGER (0..3),
    n6  INTEGER (0..5),
    n12     INTEGER (0..11),
    ...
    },
    dl-PRS-ResourceSlotOffset      INTEGER (0..
nrMaxResourceOffsetValue-1) ,
    dl-PRS-ResourceSymbolOffset       INTEGER (0..12),
    dl-PRS-QCL-Info DL-PRS-QCL-Info OPTIONAL,
    ...
}
DL-PRS-QCL-Info ::= CHOICE {
    ssb     SEQUENCE {
        pci   NR-PhysCellID,
        ssb-Index      INTEGER (0..63),
        rs-Type ENUMERATED {typeC, typeD, typeC-plus-typeD}
    },
    dl-PRS SEQUENCE {
        qcl-DL-PRS-ResourceID     NR-DL-PRS-ResourceID,
        qcl-DL-PRS-ResourceSetID   NR-DL-PRS-ResourceSetID
    }
}
NR-DL-PRS-Periodicity-and-ResourceSetSlotOffset ::= CHOICE {
    scs15      CHOICE {
        n4  INTEGER (0..3),
        n5  INTEGER (0..4),
        n8  INTEGER (0..7),
        n10     INTEGER (0..9),
        n16  INTEGER (0..15),
        n20  INTEGER (0..19),
        n32  INTEGER (0..31),
        n40  INTEGER (0..39),
        n64  INTEGER (0..63),
        n80  INTEGER (0..79),
```

```
        n160     INTEGER (0..159),
        n320     INTEGER (0..319),
        n640     INTEGER (0..639),
        n1280     INTEGER (0..1279),
        n2560     INTEGER (0..2559),
        n5120     INTEGER (0..5119),
        n10240       INTEGER (0..10239),
        ...
    },
    scs30     CHOICE {
        n8   INTEGER (0..7),
        n10   INTEGER (0..9),
        n16   INTEGER(0..15),
        n20   INTEGER(0..19),
        n32   INTEGER (0..31),
        n40   INTEGER (0..39),
        n64   INTEGER (0..63),
        n80   INTEGER (0..79),
        n128       INTEGER (0..127),
        n160       INTEGER (0..159),
        n320       INTEGER (0..319),
        n640       INTEGER (0..639),
        n1280       INTEGER (0..1279),
        n2560       INTEGER (0..2559),
        n5120       INTEGER (0..5119),
        n10240         INTEGER (0..10239),
        n20480         INTEGER (0..20479),
        ...
    },
    scs60     CHOICE {
        n16   INTEGER (0..15),
        n20   INTEGER (0..19),
        n32   INTEGER (0..31),
        n40   INTEGER (0..39),
        n64   INTEGER (0..63),
        n80   INTEGER (0..79),
        n128       INTEGER (0..127),
        n160       INTEGER (0..159),
        n256       INTEGER (0..255),
        n320       INTEGER (0..319),
        n640       INTEGER (0..639),
        n1280       INTEGER (0..1279),
        n2560       INTEGER (0..2559),
        n5120       INTEGER (0..5119),
        n10240         INTEGER (0..10239),
        n20480         INTEGER (0..20479),
        n40960         INTEGER (0..40959),
        ...
    },
    scs120     CHOICE {
        n32   INTEGER (0..31),
        n40   INTEGER (0..39),
        n64   INTEGER (0..63),
        n80   INTEGER (0..79),
        n128       INTEGER (0..127),
        n160       INTEGER (0..159),
        n256       INTEGER (0..255),
        n320       INTEGER (0..319),
        n512       INTEGER (0..511),
        n640       INTEGER (0..639),
        n1280       INTEGER (0..1279),
        n2560       INTEGER (0..2559),
        n5120       INTEGER (0..5119),
        n10240       INTEGER (0..10239),
        n20480       INTEGER (0..20479),
        n40960       INTEGER(0..40959),
        n81920       INTEGER(0..81919),
        ...
    },
    ...
}
```

Below are RRC parameters already in 38.331 for measurement with measurement gap.

```
NR-PRS-MeasurementInfoList ::= SEQUENCE (SIZE (1..maxFreqLay-
ers))
```

-continued

```
OF NR-PRS-MeasurementInfo
NR-PRS-MeasurementInfo ::=        SEQUENCE {
    nr-Meas PRS-RepetitionAndOffset    CHOICE {
        ms20            INTEGER (0..19),
        ms40            INTEGER (0..39),
        ms80            INTEGER (0..79),
        ms160           INTEGER (0..159),
        ...
    },
    nr-MeasPRS-length    ENUMERATED {ms1dot5, ms3, ms3dot5, ms4,
                                     ms5dot5, ms6, ms10, ms20},
    ...
}
dl-PRS-PointA
The ARFCN value of the carrier received from upper layers for which the
UE needs to perform the NR DL-PRS measurements.
nr-MeasPRS-RepetitionAndOffset
Indicates the gap periodicity in ms and offset in number of subframes of
the requested measurement gap for performing NR DL-PRS
measurements.
nr-MeasPRS-length
Indicates measurement gap length in ms of the requested measurement gap
for performing NR DL-PRS measurements. The measurement gap length
is according to in Table 9.1.2-1 in TS 38.133 [14].
```

Below are RRC parameters that need to be introduced to 38.331 for providing PRS configuration.

```
DL-PRS-TimeSync-Info ::=    SEQUENCE {
    dl-PRS-ID            INTEGER (0..255),
    dl-PRS-ResourceSetId        INTEGER (0..7),
    dl-PRS-ResourceId        INTEGER (0..63)      OPTIONAL -- Need S
}
```

1.2 Time Domain Design of PRS

Currently PRS is transmitted periodically for positioning purpose. For time synchronization purpose, PRS can be additionally configured as semi-persistently or a-periodically transmitted DL reference signal. The intention is, PRS is sent only when it is needed for time synchronization, and otherwise absent in order to save DL resources and reduce interference.

The RRC configuration of PRS resource type is shown below:

```
resourceType ENUMERATED{aperiodic, semiPersistent, periodic}.
```

When the PRS resource type is aperiodic, then the periodicity and resource set slot offset parameter is not applicable, this is reflected in the condition "Cond PeriodicOrSemiPersistent" shown below:

```
dl-PRS-Periodicity-and-ResourceSetSlotOffset
NR-DL-PRS-Periodicity-and-ResourceSetSlotOffset, OPTIONAL, --
Cond PeriodicOrSemiPersistent
```

This conditional presence indicates that the dl-PRS-Periodicity-and-ResourceSetSlotOffset is present if the resource type is "periodic" or "SemiPersistent". Otherwise, the field is absent.

The semi-persistent PRS is configured using the RRC protocol and activated/de-activated by a Medium Access Control, MAC, control element (CE) transmitted by the gNB. The MAC CE may indicate the serving cell ID, the TRP-ID within the serving cell (unique identification of a DL-PRS resource between the UE and the LMF), and the NR-DL-PRS-ResourceSetID within the TRP. The serving cell ID is needed because the TRP-ID is only unique within one cell. The same applies for the NR-DL-PRSResrouce-SetID for two different TRPs. In addition to the bits to indicate the PRS configuration, one additional bit is used to indicate whether it is an activation (e.g., "1") or de-activation (e.g., "0").

In another approach, a cross-MAC entity unique resource set ID can be defined. This set ID is unique for each DL-PRSResourceSet defined within different TRPs of different serving cells. This approach may save signaling overhead in case where not all serving cells have the maximum allowable number of TRPs configured. This approach also allows simultaneous activation/de-activation of different PRS in one MAC CE. It also allows an activation of one configuration while a de-activation of another configuration. For example, if it is restricted that only eight such PRS configurations can be provided to the UE, then the MAC CE in the second approach can have eight bits (one octet). Each bit indicates whether it is an activation (e.g., "1") or de-activation (e.g., "0").

In another method, after the activation by the MAC CE, the DL PRS are present for a RRC configurable time periods, indicated by durationForSemiPersistent. The field is mandatory present if the resource type is "semiPersistent." Otherwise, the field is absent. In one example, the configurable time periods are defined as the integer number of the periodicity defined in dl-PRS-Periodicity-and-ResourceSet-SlotOffset. In another example, the configurable time periods are defined as the absolute time duration such as 5 ms, 10 ms, 15 ms, 20 ms, etc.

The same principle of this method of introducing a "durationForSemiPersistent" can be added for any DL reference signals for propagation delay estimation and compensation, e.g., "downlink Reference Signal for UE Measurement of Time Synchronization: TRS" described below.

The triggering mechanism for aperiodic PRS can be downlink control information (DCI). In one method, this DCI is also used to trigger UE reporting the measurement in the UL in a future time. In between the reception time and this future time, the network transmits the PRS according to one of the configurations indexed by information in a field in the DCI.

1.3 Frequency Domain Design of PRS

In one preferred embodiment, no measurement gaps are necessary for time synchronization purpose, since the UE is only required to receive PRS of the serving cell, and not required to receive PRS of neighboring cells. In this case, the UE is only required to measure DL PRS within the active bandwidth part (BWP) and with the same numerology as the active DL BWP.

In another embodiment, to prepare for handover, the UE needs to perform measurements of PRS of neighbour cells. In this case, the serving cells obtains PRS information of the target cell, and transmits it to the UE. The UE then performs measurement of neighbour cell PRS accordingly. Measurement gaps may be provided by the serving cell to fit the neighbour cell PRS pattern, so that no DL signals in the serving cells interfere with the neighbour cell PRS and also UE is able to tune its radio to measure the PRS in the neighbouring cell while not listening to the transmission from the current serving cell 1.4 Sequence Generation of PRS In general, the pseudo-random sequence generator shall be initialized with:

$$c_{init} = \left(2^{22}\left\lfloor\frac{n_{ID,seq}^{PRS}}{1024}\right\rfloor + \right.$$

$$\left. 2^{10}\left(N_{symb}^{slot}n_{s,f}^{\mu} + l + 1\right)\left(2\left(n_{ID,seq}^{PRS}\bmod 1024\right) + 1\right) + \left(n_{ID,seq}^{PRS}\bmod 1024\right)\right)\bmod 2^{31}$$

where $$n_{s,f}^{\mu}$$

is the slot number, the downlink PRS sequence ID $$n_{ID,seq}^{PRS} \in \{0, 1, \cdots, 4095\}$$

is given by the higher-layer parameter dl-PRS-SequenceID, and 1 is the OFDM symbol within the slot to which the sequence is mapped. For time synchronization, sequence ID is limited to $$n_{ID,seq}^{PRS} \in \{0, 1, \cdots, 1023\}$$

so that DL PRS can be compatible with CSI-RS.

1.5 Resource Configuration of PRS

For time synchronization, the UE only needs to be configured with the PRS of one TRP only, preferably the TRP that serves as primary serving cell of the UE (i.e., the TRP in the PCell). The reason is that the reference cell for reference time delivery is the PCell. If only one TRP is allowed, then nrMaxTrpPerCell in the RRC configuration example is set to one.

Up to nrMaxSetsPerTrp (the constant defined in the RRC configuration example) resource sets can be configured for the provided TRP. One example is with two resource set for the provided TRP.

Each resource set contains multiple resources. Each resource can correspond to a different beam in the spatial domain. A UE may be able to reliably detect only a subset of the beams (or resources) in the resource set. Different UE may receive different beams, depending on each UE's location, for example.

1.6 PRS Muting

PRS muting can be defined to control the interference of PRS in one cell towards a neighbor cell. To achieve the reduction of mutual interference among neighbor cells, the neighbor gNBs can coordinate with each other about the PRS muting pattern. The coordination can be via exchange of information elements over the Xn interface between gNBs in a distributed manner. Note that for time synchronization purpose, there is no entity such as location server (which exist for the positioning purpose but not timing synchronization) to act as central coordinator for the gNBs.

In another example, in the case of time synchronization integrated with Time Sensitive Networking (TSN) (See section 5.27.1 of TS 23.501 version 16.4.0), the NW-TT (network side Translator function) residing together with User Plane Function (UPF) and at the edge of the 5G system can replace the role of the location server. All gNBs transmit the PRS muting patterns to NW-TT. NW-TT then forwards to one gNB its neighbor gNB's muting patterns. In another example, NW-TT may assign PRS muting pattern to different gNBs. This is useful when neighbor gNBs may not have Xn interfaces between them. This approach also requires that a gNB to report to NW-TT the neighboring gNBs which can be acquired by listening to neighboring gNB's system information.

1.7 NR DL PRS Processing Capability for Time Synchronization

The DL PRS processing capability can be reported by the UE, for time synchronization purpose. For example, the UE may report the following one or more capabilities to the gNB before the start of measurement for time synchronization: 1) Max number of frequency layers; 2) Max number of TRPs per frequency layer; 3) Max number of PRS resource sets per TRP per frequency layer; 4) Max number of Resources per PRS resource set (X4); 5) Max number of DL PRS Resources per UE; 6) Max number of TRPs for all frequency layers per UE; 7) Max number of Resources per frequency layer; 8) Whether the above has any difference in Frequency Range 1 or Frequency Range 2; or 9) Whether the above has any difference in TDD or FDD.

2. Downlink Reference Signal for UE Measurement of Time Synchronization: TRS Tracking RS (TRS) (a.k.a., "CSI-RS for tracking") can be used by the UE to obtain timing measurement. TRS can be used by itself, or together with a compatible set of PRS.

In this case, for a UE configured to perform timing measurement for time synchronization purpose, the UE in RRC connected mode is expected to receive the higher layer UE specific configuration of a NZP-CSI-RS-ResourceSet (shown in table below) configured with higher layer parameter trs-Info set to 'true'.

| NZP-CSI-RS-ResourceSet ::= | SEQUENCE { |
|---|---|
| nzp-CSI-ResourceSetId | NZP-CSI-RS- |
| ResourceSetId, | |
| nzp-CSI-RS-Resources | SEQUENCE (SIZE |
| (1..maxNrofNZP-CSI-RS-ResourcesPerSet)) OF NZP-CSI-RS- | |
| ResourceId, | |
| repetition | ENUMERATED { on, off } |
| OPTIONAL, -- Need S | |
| aperiodicTriggeringOffset | INTEGER (0..6) |
| OPTIONAL, -- Need S | |
| trs-Info | ENUMERATED {true} |
| OPTIONAL, -- Need R | |
| ..., | |
| [[ | |
| aperiodicTriggeringOffset | INTEGER (0..31) |
| OPTIONAL -- Need S | |
| ]] | |
| } | |

To improve time synchronization accuracy, the existing TRS can be enhanced.

In one example, the periodicity and slot offset for periodic NZP CSI-RS resources are flexible and can be configured according to the needs of time synchronization. In Rel-15/Rel-16, the periodicity is limited to one of $2^{\mu}X_p$ slots where $x_p=\{10, 20, 40, \text{ or } 80\}$ and $\mu$ can be $\{0, 1, 2, 3\}$ according to the SCS, i.e., the periodicity is $\{10, 20, 40, \text{ or } 80\}$ms. In NR, one slot is always one $2^{-\mu}$ millisecond. In order to fit the TSN clock synchronization needs, more flexible periodicity configurations can be provided. In the following, M is the maximum periodicity value, M can be taken as 80 as in Rel-15/Rel-16, or M can be taken as other values, e.g., M=120.

For instance, allow any periodicity that is a multiple of 10 slots, up to M (ms). Then one option is, the periodicity is one of $2^{\mu}X_p$ slots where $X_p=\{10, 20, 30, 40, 45, \ldots, \text{ or } M\}$, where M is a multiple of 10.

For instance, allow any periodicity that is a multiple of 5 slots, up to M (ms). Then one option is, the periodicity is one of $2^\mu X_p$ slots where $X_p=\{5, 10, 15, 20, 25, 30, 40, 45, \ldots, M-5, \text{ or } M\}$, where M is a multiple of 5.

For instance, allow any periodicity that is a multiple of 1 slot, up to M (ms). Then one option is, the periodicity is one of $2^\mu X_p$ slots where $X_p=\{1, 2, 3, \ldots, M-2, M-1, \text{ or } M\}$, where M is an integer.

Figure 3:
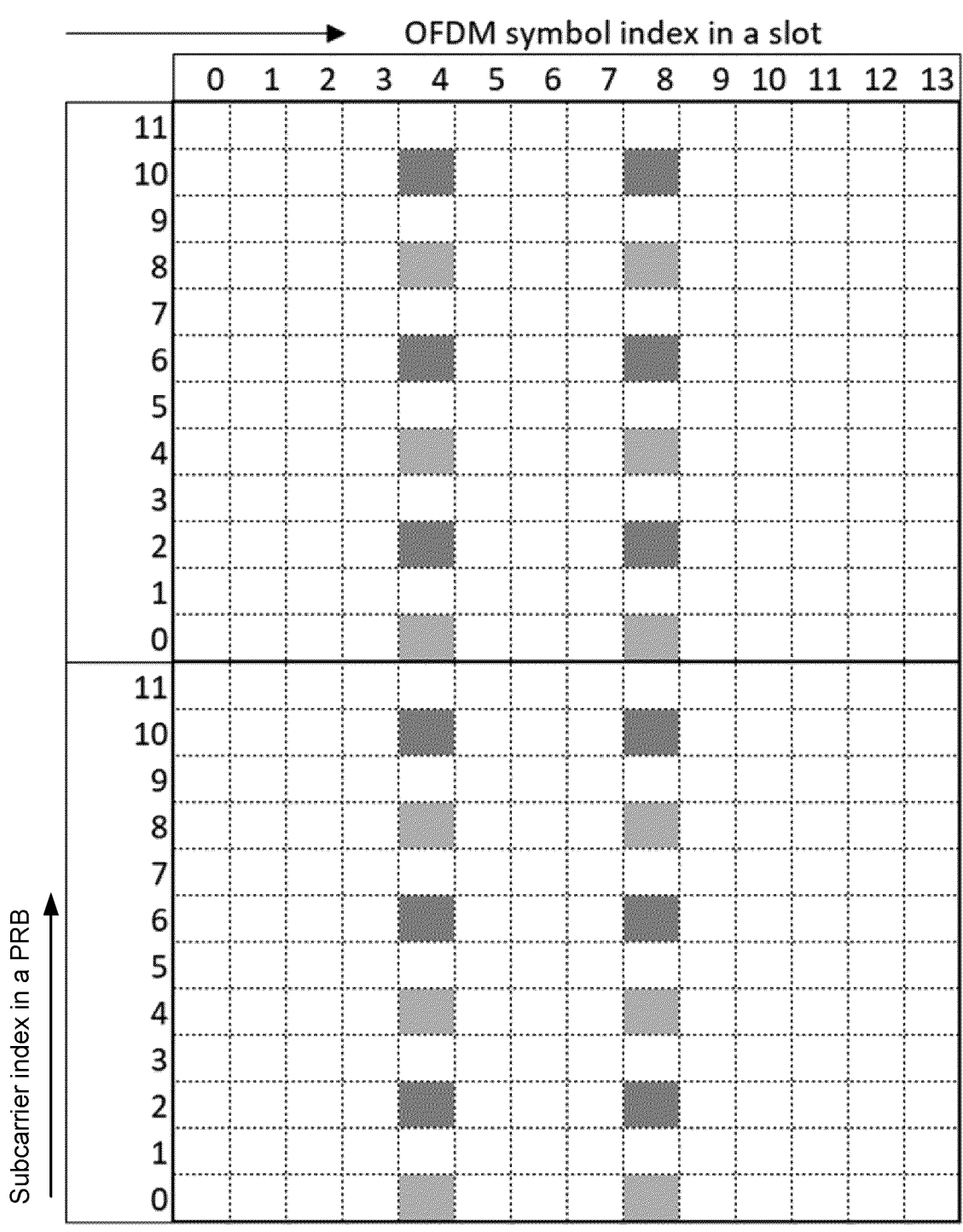
FIG. 3. illustrates an example of enhanced TRS according to another embodiment.

In one example, more density than $\rho=3$ is supported for TRS. For example, $\rho=6$ (i.e., CSI-RS occupies 6 subcarriers within each RB) can be additionally supported. Alternatively, $\rho=6$ as illustrated in FIG. 3 can be achieved by two sets of NZP-CSI-RS, where both sets of NZP-CSI-RS are configured with the same l, but with frequencyDomainAllocation that have offset to each other. For example, one NZP-CSI-RS have the blue REs, the other NZP-CSI-RS have the orange REs.

In one example, more symbols in a slot are supported. For instance, there can be 2, 4, 6, or 8 CSI-RS resources in a slot. Correspondingly, 4, 8, 12, or 16 CSI-RS resources in two consecutive slots, which are the same across two consecutive slots. The time-domain locations as defined by higher layer parameter CSI-RS-resourceMapping, is given by one of the following.

If 4 CSI-RS resources in a slot:

Two sets from $\{l\in\{4,8\}, l\in\{5,9\}, \text{ or } l\in\{6,10\}\}$ for frequency range 1 and frequency range 2. For example, $l\in\{4,5,8,9\}$ or $l\in\{5,6,9,10\}$;

Two sets from $\{\{l\in0,4\}, l\in\{1,5\}, l\in\{2,6\}, l\in\{3,7\}, l\in\{7,11\}, l\in\{8,12\} \text{ or } l\in\{9,13\}\}$ for frequency range 2. For example, $l\in\{0,1,4,5\}$ or $l\in\{2,3,6,7\}$;

The 4 CSI-RS resources in a slot can be achieved by the gNB configuring two sets of NZP-CSI-RS, where the two sets of NZP-CSI-RS are configured with the different 'firstOFDMSymbolInTimeDomain' and 'firstOFDMSymbolInTimeDomain2'. As an example, in FIG. 2, one NZP-CSI-RS have the blue REs, the other NZP-CSI-RS have the orange REs.

If 6 CSI-RS resources in a slot: three pairs of symbols, with two symbols in a pair separated by 4 symbols for both FR1 and FR2. For example, $l\in\{4,5,6,8,9,10\}$, or $l\in\{0,1,2, 4,5,6\}$; the 6 CSI-RS resources in a slot can be achieved by the gNB configuring three sets of NZP-CSI-RS.

If 8 CSI-RS resources in a slot: four pairs of symbols, with two symbols in a pair separated by 4 symbols for both FR1 and FR2. For example, $l\in\{3,4,5,6,7,8,9,10\}$; the 8 CSI-RS resources in a slot can be achieved by the gNB configuring four sets of NZP-CSI-RS.

In one example, the TRS burst can be composed of more than two slots, where the TRS burst is the number of slots allocated with TRS in a TRS period. For example, in addition to a burst of 1 or two slots per periodicity, n consecutive slots per periodicity can be supported, where $2^\mu X_p > n > 2$.

In one example, wider BW can be supported for TRS. The increased BW can be for operation on any of paired spectrum (i.e., FDD), unpaired spectrum (i.e., TDD), shared spectrum channel access. For example, instead of limiting the TRS to 52 PRB or fewer, the TRS bandwidth can be increased to up to $X_{max}$ PRBs, where $272 >= X_{max} > 52$. For example, the minimum bandwidth of TRS can be increased. The increase can be for both FR1 and FR2, or for FR2 only or for both. For instance, the minimum TRS for time synchronization is configured to be X PRBs, where $X \geq 32$ resources if the UE indicates trs-AddBW-Set1 for the trs- AdditionalBandwidth capability and $X \geq 36$ if the UE indicates trs-AddBW-Set2 for the AdditionalBandwidth capability.

Figure 2:
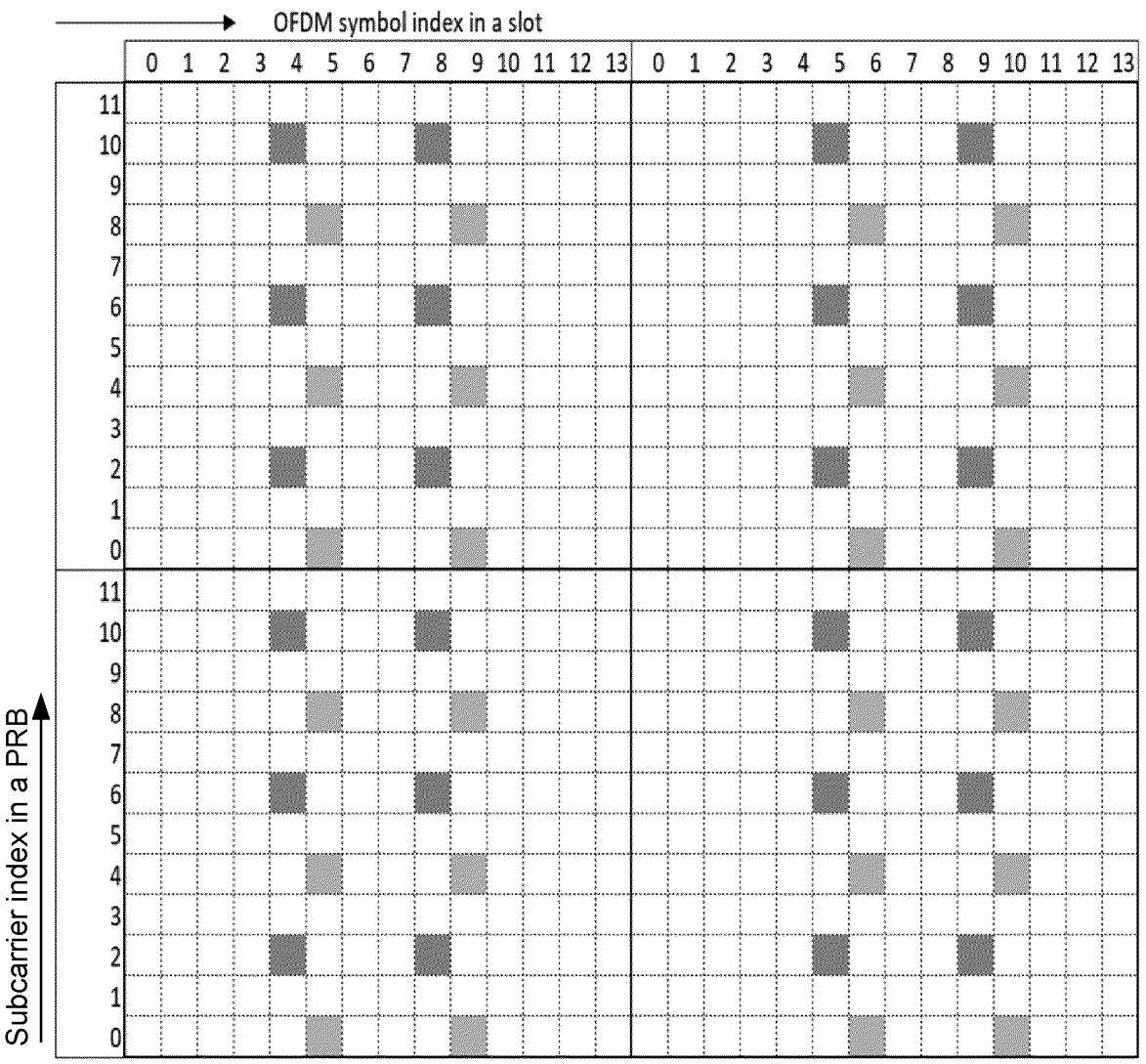
FIG. 2. illustrates an example of enhanced TRS according to an embodiment.

FIG. 2 illustrates an example of enhanced TRS in a period, where the TRS burst is composed of two slots. The TRS is present in four symbols $l\in\{4,5,8,9\}$, the density in frequency domain is $\rho=3$. The subcarrier offset for $l\in\{4,8\}$ and the subcarrier offset for $l\in\{5,9\}$ are configured to be separated by 2 subcarriers.

FIG. 3 illustrates an example of enhanced TRS in a period, where the TRS burst is composed of one slot. The TRS is present in two symbols $l\in\{4,8\}$, the density in frequency domain is increased to $\rho=6$, with the 6 REs evenly spaced out over the 12 subcarriers in the PRB.

In the case of tracking RS (a.k.a, "CSI-RS for tracking") used by the UE to obtain timing measurement, the legacy RRC configuration for CSI report can be re-used. The CSI report is configured in the IF CSI-MeasConfig (shown below) which is sent in the IF ServingCellConfig of the RRC message RRCReconfiguration.

```
CSI-MeasConfig ::=                    SEQUENCE {
    ...
    csi-ReportConfigToAddModList      SEQUENCE (SIZE
    (1..maxNrofCSI-ReportConfigurations)) OF CSI-ReportConfig
    OPTIONAL, -- Need N
    csi-ReportConfigToReleaseList     SEQUENCE (SIZE
    (1..maxNrofCSI-ReportConfigurations)) OF CSI-ReportConfigId
    }
```

The IF CSI-MeasConfig contains the CSI-ReportConfig IE (shown below) which links the resource identified by the ID CSI-ResourceConfigId and the report ID CSI-ReportConfigId. The report then indicates the type of reporting, like periodic, semi-persistent, or aperiodic.

```
CSI-ReportConfig ::=                  SEQUENCE {
    reportConfigId                    CSI-ReportConfigId,
    ...
    resourcesForChannelMeasurement    CSI-ResourceConfigId,
    reportConfigType                  CHOICE {
        periodic                      SEQUENCE {
            ...                       SEQUENCE {
        },
        semiPersistentOnPUCCH
            ...                       SEQUENCE {
        },
        semiPersistentOnPUSCH
            ...                       SEQUENCE {
        },
        aperiodic
            ...
        }
    },
    }
    }
```

The resource configuration identified by the CSI-ResourceConfigId then includes the configuration of the CSI-RS resources. This IE (CSI-ResourceConfig) also contains the reference signal resource type like, periodic, aperiodic, and the bwp ID, and etc.

```
CSI-ResourceConfig ::= SEQUENCE {
    csi-ResourceConfigId              CSI-ResourceConfigId,
    csi-RS-ResourceSetList            CHOICE {
        nzp-CSI-RS-SSB                SEQUENCE {
            nzp-CSI-RS-ResourceSetList   SEQUENCE (SIZE
    (1..maxNrofNZP-CSI-RS-ResourceSetsPerConfig)) OF NZP-CSI-RS-
```

-continued

```
ResourceSetId OPTIONAL, -- Need R
      csi-SSB-ResourceSetList       SEQUENCE (SIZE
(1..maxNrofCSI-SSB-ResourceSetsPerConfig)) OF CSI-SSB-
ResourceSetId OPTIONAL -- Need R
      },
      csi-IM-ResourceSetList        SEQUENCE (SIZE (1..
maxNrofCSI-IM-ResourceSetsPerConfig)) OF CSI-IM-ResourceSetId
      },
      bwp-Id                        BWP-Id,
      resourceType                  ENUMERATED { aperiodic,
semiPersistent, periodic },
      ...
   ...
}
```

Multiple reference signals can be used in CSI-ResourceConfigId, like NZP CSI RS, CSI IM, SCI SSB. In the case that NZP-CSI-RS is used, the PHY layer details of the CSI-RS resources defined as below, including power, scrambling ID, periodicity, and etc

```
NZP-CSI-RS-Resource ::=       SEQUENCE {
   nzp-CSI-RS-ResourceId         NZP-CSI-RS-ResourceId,
   resourceMapping               CSI-RS-ResourceMapping,
   powerControlOffset            INTEGER (-8..15),
   powerControlOffsetSS          ENUMERATED {db-3, db0, db3,
db6}            OPTIONAL,   -- Need R
   scramblingID                  ScramblingId,
   periodicityAndOffset          CSI-
ResourcePeriodicityAndOffset     OPTIONAL,   -- Cond
PeriodicOrSemiPersistent
   qcl-InfoPeriodicCSI-RS        TCI-StateId
OPTIONAL,   -- Cond Periodic
   ...
}
```

The resource mapping illustrated in the FIGS. 2 and 3, is done by the below IE CSI-RS-ResourceMapping.

| CSI-RS-ResourceMapping information element |
| --- |

```
CSI-RS-ResourceMapping ::=    SEQUENCE {
   frequencyDomainAllocation     CHOICE {
      row1                          BIT STRING (SIZE (4)),
      row2                          BIT STRING (SIZE (12)),
      row4                          BIT STRING (SIZE (3)),
      other                         BIT STRING (SIZE (6))
   },
   nrofPorts                     ENUMERATED
{p1, p2, p4, p8, p12, p16, p24,
```

-continued

| CSI-RS-ResourceMapping information element |
| --- |

```
p32},
   firstOFDMSymbolInTimeDomain   INTEGER (0..13),
   firstOFDMSymbolInTimeDomain2  INTEGER (2..12)
OPTIONAL,   -- Need R
   cdm-Type                      ENUMERATED {noCDM, fd-
CDM2, cdm4-FD2-TD2, cdm8-FD2-TD4},
   density                       CHOICE {
      dot5                          ENUMERATED {evenPRBs,
oddPRBs},
      one                           NULL,
      three                         NULL,
      spare                         NULL
   },
   freqBand                      CSI-FrequencyOccupation,
   ...
}
```

3. Uplink Reference Signal for TRP Measurement of Time Synchronization

The UL SRS for positioning design can be largely reused for time synchronization purpose, including the sequence, the SRS resource type, comb design, and symbol location in a slot, etc.

On the other hand, some parameters may be set differently for time synchronization purpose, as compared to positioning. One reason is, the SRS for time synchronization needs to be detected by the serving TRP only, whereas for positioning purpose, the SRS needs to be detected by multiple TRPs.

For example, a new antenna port can be defined for sending UL SRS for time synchronization.

Also, collision handling of SRS for time synchronization can be handled differently than SRS for other purposes. For instance, SRS for time synchronization is designated with higher priority than SRS for other purposes. If collision occurs between different SRS types, SRS for time synchronization is preserved and other SRS types are dropped.

Additionally, for time synchronization purpose, only DL reference signal of the serving cell is used as DL path loss reference for the purpose of SRS power control. For example, SSB of neighbour cells do not need to be included in the SRS configuration (e.g., 'SSB-InfoNcell') for time synchronization.

If TRS is used together with SRS for time synchronization, then the CSI-RS resource ID (i.e., 'NZP-CSI-RS-ResourceId') of TRS (aka, "CSI-RS for tracking") can be used as the DL path loss reference signal to pair with the UL SRS. As an example, the RRC configuration is provided in the table below:

```
SRS-Config ::= SEQUENCE {
      srs-ResourceSetToReleaseList SEQUENCE (SIZE(1..maxNrofSRS-ResourceSets)) OF SRS-
ResourceSetId OPTIONAL, -- Need N
      srs-ResourceSetToAddModList SEQUENCE (SIZE(1..maxNrofSRS-ResourceSets)) OF SRS-
ResourceSet OPTIONAL, -- Need N
      srs-ResourceToReleaseList SEQUENCE (SIZE(1..maxNrofSRS-Resources)) OF SRS-ResourceId
OPTIONAL, -- Need N
      srs-ResourceToAddModList SEQUENCE (SIZE(1..maxNrofSRS-Resources)) OF SRS-Resource
OPTIONAL, -- Need N
      tpc-Accumulation ENUMERATED {disabled}   OPTIONAL, -- Need S
      ...,
      [[
      srs-RequestDCI-1-2 INTEGER (1..2) OPTIONAL, -- Need S
      srs-RequestDCI-0-2 INTEGER (1..2) OPTIONAL, -- Need S
      srs-ResourceSetToAddModListDCI-0-2 SEQUENCE (SIZE(1..maxNrofSRS-ResourceSets)) OF SRS-
ResourceSet OPTIONAL, -- Need N
      srs-ResourceSetToReleaseListDCI-0-2 SEQUENCE (SIZE(1..maxNrofSRS-ResourceSets)) OF SRS-
ResourceSetId OPTIONAL, -- Need N
      srs-PosResourceSetToReleaseList SEQUENCE (SIZE(1..maxNrofSRS-PosResourceSets)) OF SRS-
PosResourceSetId
```

-continued

```
      OPTIONAL, -- Need N
   srs-PosResourceSetToAddModList SEQUENCE (SIZE(1..maxNrofSRS-PosResourceSets)) OF SRS-
PosResourceSet OPTIONAL, -- Need N
   srs-PosResourceToReleaseList SEQUENCE (SIZE(1..maxNrofSRS-PosResources)) OF SRS-
PosResourceId OPTIONAL, -- Need N
   srs-PosResourceToAddModList SEQUENCE (SIZE(1..maxNrofSRS-PosResources)) OF SRS-
PosResource OPTIONAL -- Need N
]]
...
   [[
   srs-TimeSyncResourceSetToAddModList SEQUENCE (SIZE(1..maxNrofSRS-TimeSyncResourceSets))
OF SRS-TimeSyncResourceSet OPTIONAL,-- Need N
   srs-TimeSyncResourceToReleaseList SEQUENCE (SIZE(1..maxNrofSRS-TimeSyncResources)) OF
SRS-TimeSyncResourceId OPTIONAL,-- Need N
   srs-TimeSyncResource ToAddModList SEQUENCE (SIZE(1..maxNrofSRS-TimeSyncResources)) OF
SRS-TimeSyncResource OPTIONAL -- Need N
]]
}
SRS-TimeSyncResourceSet ::= SEQUENCE {
   srs-TimeSyncResourceSetId SRS-TimeSyncResourceSetId,
   srs-TimeSyncResourceIdList SEQUENCE (SIZE(1..maxNrofSRS-ResourcesPerSet)) OF SRS-
TimeSyncResourceId
       OPTIONAL, -- Cond Setup
   resourceType CHOICE {
 aperiodic SEQUENCE {
   aperiodicSRS-ResourceTriggerList SEQUENCE (SIZE(1..maxNrofSRS-TriggerStates-1))
     OF INTEGER (1..maxNrofSRS-TriggerStates-1) OPTIONAL, -- Need M
    ...
 },
 semi-persistent SEQUENCE {
    ...
 },
 periodic   SEQUENCE {
    ...
 }
   },
   alpha   Alpha   OPTIONAL, -- Need S
   p0   INTEGER (-202..24)   OPTIONAL, -- Cond Setup
   pathlossReferenceRS-TimeSync CHOICE {
 ssb-Index                 SSB-Index,
          ssb-Ncell SSB-InfoNcell,
 csi-RS-Index                    NZP-CSI-RS-ResourceId,
 dl-PRS DL-PRS-Info
   }      OPTIONAL, -- Need M
   ...
}
SRS-TimeSyncResource ::= SEQUENCE {
   srs-TimeSyncResourceId SRS-TimeSyncResourceId,
   transmissionComb CHOICE {
 n2   SEQUENCE {
   combOffset-n2 INTEGER (0..1),
   cyclicShift-n2 INTEGER (0..7)
 },
 n4   SEQUENCE {
   combOffset-n4-16 INTEGER (0..3),
   cyclicShift-n4 INTEGER (0..11)
 },
 n8   SEQUENCE {
   combOffset-n8 INTEGER (0..7),
   cyclicShift-n8 INTEGER (0..5)
 },
   ...
   },
   resourceMapping SEQUENCE {
 startPosition INTEGER (0..13),
 nrofSymbols   ENUMERATED {n1, n2, n4, n8, n12}
   },
   freqDomainShift INTEGER (0..268),
   freqHopping SEQUENCE {
 c-SRS INTEGER (0..63),
 ...
   },
   groupOrSequenceHopping ENUMERATED { neither, groupHopping, sequenceHopping },
   resourceType CHOICE {
 aperiodic   SEQUENCE {
   slotOffset   INTEGER (1..32)   OPTIONAL, -- Need S
   ...
 },
 semi-persistent SEQUENCE {
```

-continued

```
      periodicityAndOffset-sp SRS-PeriodicityAndOffset,
      ...
   },
   periodic SEQUENCE {
      periodicityAndOffset-p   SRS-PeriodicityAndOffset,
      ...
   }
      },
      sequenceId   INTEGER (0..65535),
      spatialRelationInfo   SRS-SpatialRelationInfo   OPTIONAL, -- Need R
      ...
}
SRS-TimeSyncResourceSetId ::= INTEGER (0..maxNrofSRS-TimeSyncResourceSets-1)
```

4. Coupling of DL RS and UL RS

For both TA based method and RTT based method, it is preferred that the same set of {downlink reference signal, uplink reference signal} be used in the calculation of timing at the UE and calculation of timing at the gNB.

For example, the same pair of {DL PRS, UL SRS} is used by both gNB and UE at approximately the same time for time synchronization calculation.

In contrast, it is not preferred that (a) gNB uses {DL PRS, UL PRACH} for uplink timing estimation, whereas (b) UE uses {DL TRS, UL SRS} for downlink timing estimation, and then perform time synchronization using (a) and (b).

Thus it is preferable that the gNB uses RRC configuration to group a set of {downlink reference signal, uplink reference signal} in one information element for time synchronization purpose.

In one example, a pointer to the uplink reference signal is added in the new IE NR-DL-PRS-ResourceSet, as shown below:

```
NR-DL-PRS-ResourceSet ::= SEQUENCE {
   nr-DL-PRS-ResourceSetID      NR-DL-PRS-ResourceSetID,
   srs-ResourceSetId            SRS-ResourceSetId
   -- others skipped --
}
In another example, a pointer to the list of the uplink reference signals is added per TRP. This
is reflected in the below yellow part in the IE one level up NR-DL-PRS-InfoPerTRP
NR-DL-PRS-InfoPerTRP ::= SEQUENCE {
   nr-DL-PRS-InfoPerTRP-ID        INTEGER (0:nrMaxTrpPerCell-1)
   nr-DL-PRS-ResourceSetAddModList SEQUENCE (SIZE
                                (1..nrMaxSetsPerTrp)) OF
                                NR-DL-PRS-ResourceSet,
   associated-SRS-ResourceSetId    SEQUENCE (SIZE
                                (1..nrMaxSetsPerTrp)) OF
                                SRS-ResourceSetId,
}
```

Figure 4:
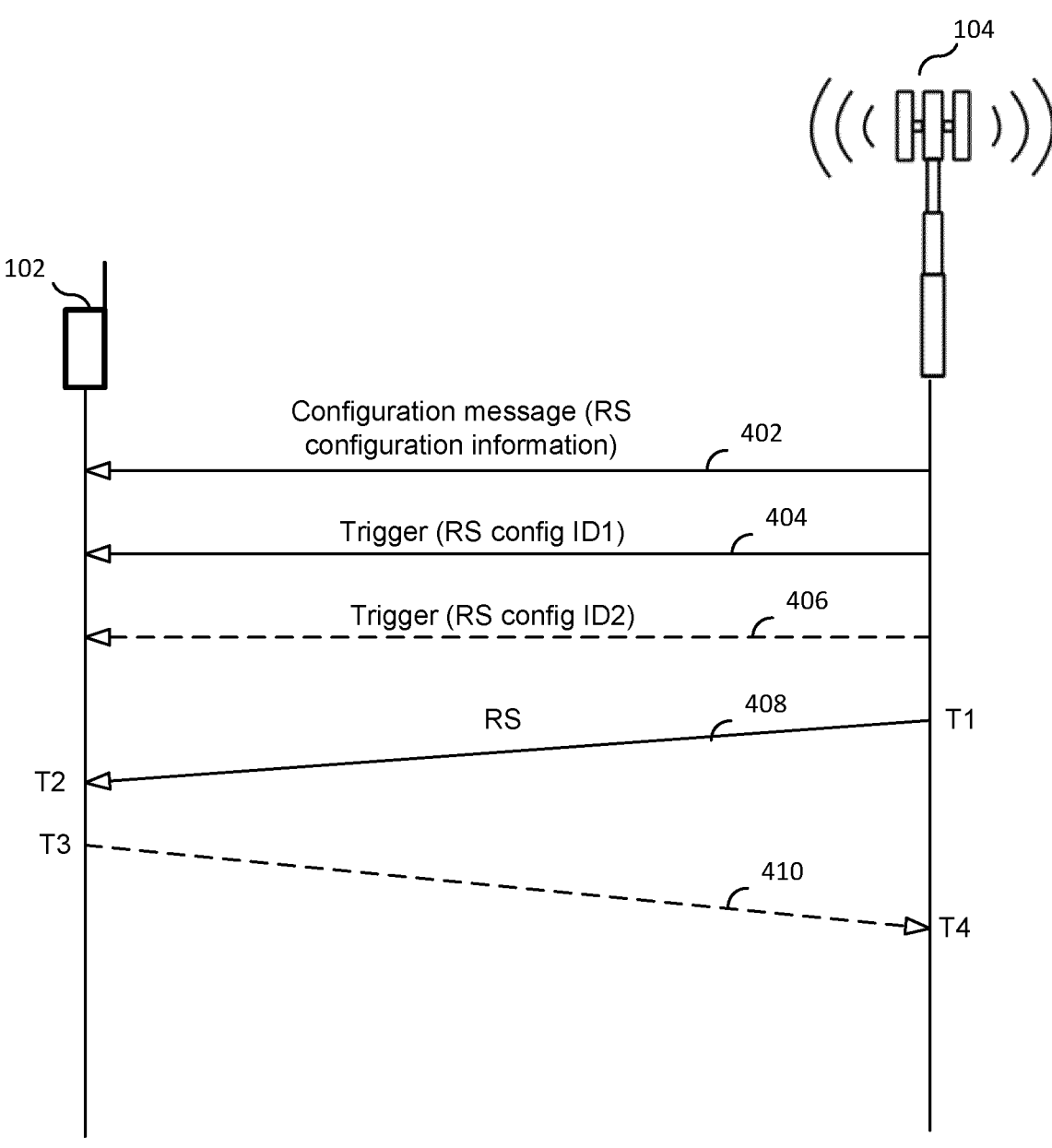
FIG. 4 is a message flow diagram illustrating a process for determining RTT.

FIG. 4 is a message flow diagram illustrating a process according to an embodiment. In the embodiment shown, the process starts with gNB 104 transmitting a configuration message 402 (e.g., an RRC Reconfiguration message) that comprises reference signal, RS, resource configuration information for a RS resource configuration. For example, the RS resource configuration information may comprise or consist of PRS resource configuration information defining a PRS resource configuration. As another example, the RS resource configuration information may comprise or consist of TRS resource configuration information defining a TRS resource configuration.

After transmitting the configuration message 402, gNB 104 transmits a trigger message 404 to the UE, where trigger message 404 comprises information for identifying the RS resource configuration. In some embodiments, gNB 104 may also transmit a second trigger message 406 to the UE, where trigger message 406 comprises information for identifying a second RS resource configuration that for use by UE 102 in transmitting an RS to gNB 104.

After transmitting trigger message 404, gNB 104 transmits an RS 408 (e.g., an RS burst) according to the RS resource configuration identified by trigger message 404. gNB 104 also records the time at which it transmitted the RS (this time is denoted T1) and UE 102 records the time at which UE 102 receives RS 408 (this time is denoted T2). In some embodiments, UE 102 transmit signal 410 to gNB 104. In this embodiment, UE 102 records the time at which it transmitted signal 410 (this time is denoted T3) and gNB 104 records the time at which it received signal 410 (this time is denoted T4). UE 102 then calculates $UE_{Rx\text{-}Tx}\text{diff}=T3-T2$ and gNB 104 calculates $gNB_{Rx\text{-}Tx}\text{diff}=T4-T1$. The propagation delay can then be calculated as $RTT=UE_{Rx\text{-}Tx}\text{diff}+gNB_{Rx\text{-}Tx}\text{diff}$.

Figure 9:
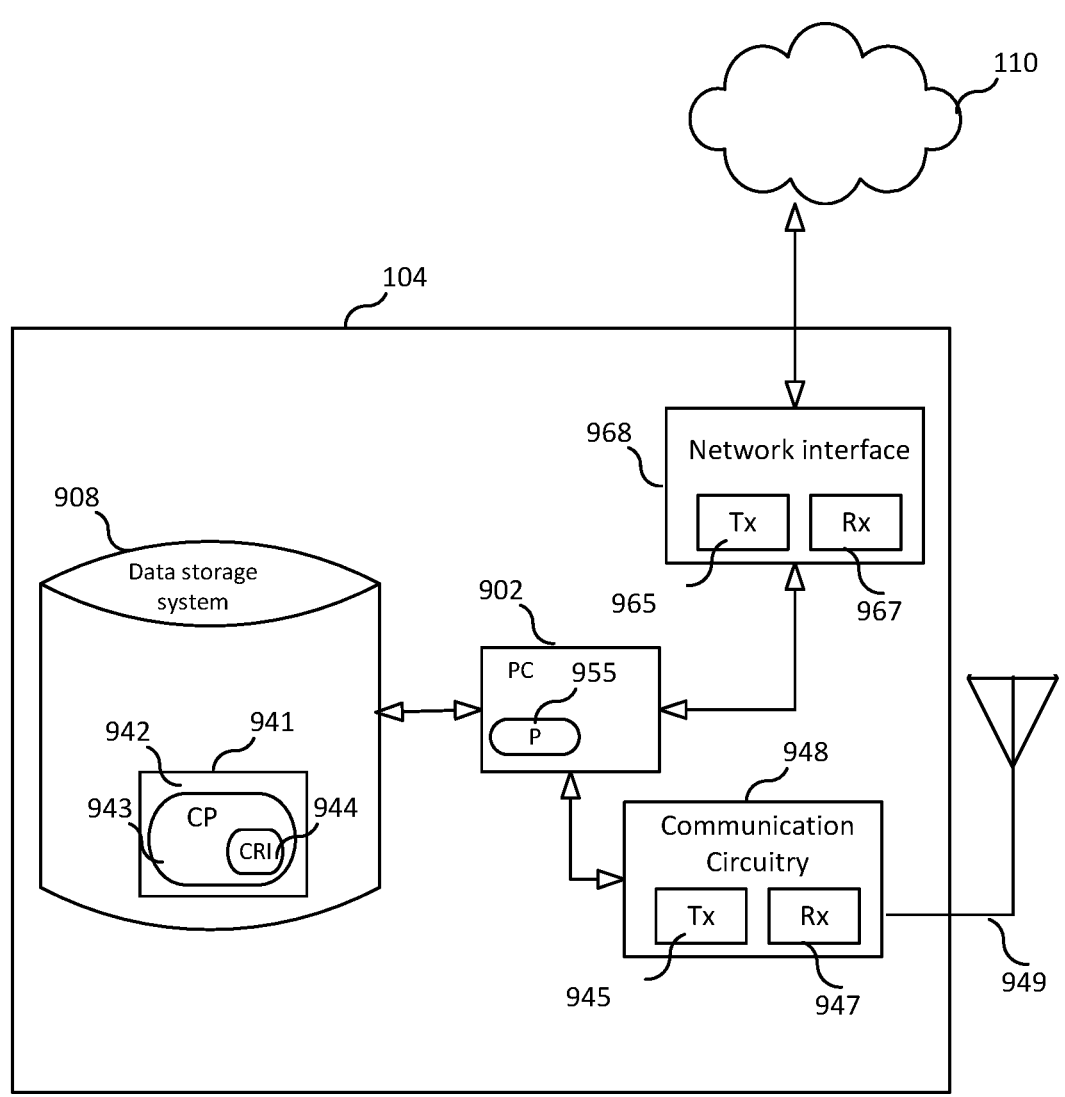
FIG. 9 illustrates a gNB according to some embodiments.

FIG. 9 is a block diagram of base station 104, according to some embodiments, for performing base station methods disclosed herein. As shown in FIG. 9, base station 104 may comprise: processing circuitry (PC) 902, which may include one or more processors (P) 955 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., base station 104 may be a distributed computing apparatus); at least one network interface 968 comprising a transmitter (Tx) 965 and a receiver (Rx) 967 for enabling base station 104 to transmit data to and receive data from other nodes connected to a network 110 (e.g., an Internet Protocol (IP) network) to which network interface 968 is connected; communication circuitry 948, which is coupled to an antenna arrangement 949 comprising one or more antennas and which comprises a transmitter (Tx) 945 and a receiver (Rx) 947 for enabling base station 104 to transmit data and receive data (e.g., wirelessly transmit/ receive data); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes base station 104 to perform steps described herein (e.g., steps described herein with reference to the flow charts). In other embodiments, base station 104 may be configured to perform steps described herein without the need for code. That is, for example, PC 902 may consist merely of one or more ASICs. Hence, the features of the embodiments described herein may be implemented in hardware and/or software.

Figure 10:
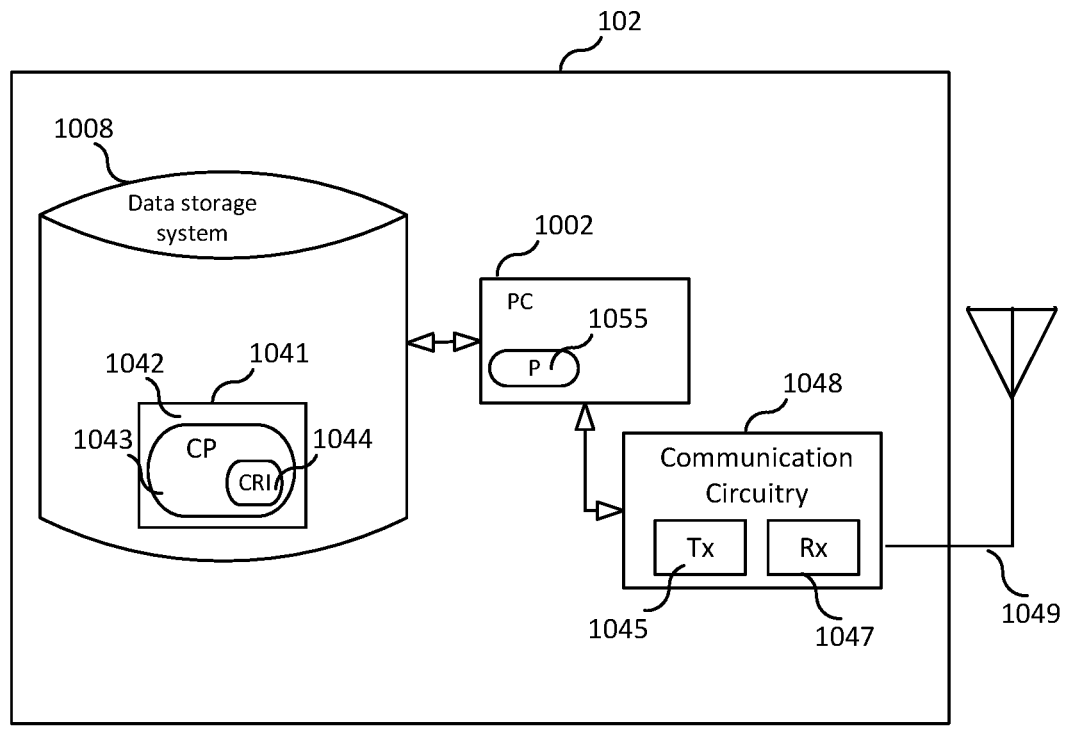
FIG. 10 illustrates a UE according to some embodiments.

FIG. 10 is a block diagram of UE 102, according to some embodiments. As shown in FIG. 10, UE 102 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like); communication circuitry 1048, which is coupled to an antenna arrangement 1049 comprising one or more antennas and which comprises a transmitter (Tx) 1045 and a receiver (Rx) 1047 for enabling UE 102 to transmit data and receive data (e.g., wirelessly transmit/receive data); and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes UE 102 to perform steps described herein (e.g., steps described herein with reference to the flow charts). In other embodiments, UE 102 may be configured to perform steps described herein without the need for code. That is, for example, PC 1002 may consist merely of one or more ASICs. Hence, the features of the embodiments described herein may be implemented in hardware and/or software.

Summary of Various Embodiments

A1. A method 500 (see FIG. 5) performed by a UE (e.g., UE 102), the method comprising: the UE receiving a configuration message (e.g., an RRC Reconfiguration message) that comprises positioning reference signal, PRS, resource configuration information defining a PRS resource configuration (see step s502); the UE receiving a trigger message (e.g., MAC CE or DCI) transmitted by a base station (e.g., base station 104) (see step s504), the trigger message comprising information for identifying the PRS resource configuration; and after receiving the trigger message, the UE receiving a PRS transmitted by the base station according to the PRS resource configuration (see step s506). In some embodiments, the PRS is a semi-persistently or an a-periodically transmitted DL reference signal.

A2. The method of embodiment A1, further comprising: the UE recording a first time value, T1, indicating the time at which the UE received the PRS; the UE transmitting a signal to the base station; the UE recoding a second time value, T2, indicating the time at which the UE transmitted the signal; and the UE calculating either T1–T2 or T2–T1.

A3. The method of embodiment A2, wherein the UE transmits the signal to the base station as a result of receiving the trigger message.

A4. The method of embodiment A3, wherein the PRS configuration comprises a pointer to an uplink configuration and the UE transmits the signal to the base station according to the uplink configuration.

A5. The method of any one of claims A1-A4, wherein the UE is configured with the PRS of one transmission and reception point (TRP) only.

A6. The method of claim A5, wherein the one TRP is in the primary serving cell of the UE.

B1. A method 600 (see FIG. 6) performed by a UE (e.g., UE 102), the method comprising: the UE receiving a configuration message (e.g., an RRC Reconfiguration message) that comprises tracking reference signal, TRS, resource configuration information defining a TRS resource configuration (see step s602); the UE receiving a trigger message (e.g., MAC CE or DCI) transmitted by a base station (104) (see step s604), the trigger message comprising information for identifying the TRS resource configuration; and after receiving the trigger message, the UE receiving a TRS burst transmitted by the base station according to the TRS resource configuration (see step s606), wherein in the time domain, the TRS burst is present during at least three different symbols of a first slot, and/or in the frequency domain, the TRS burst has a density of at least 4 for at least the first slot (i.e., in a given symbol of the first slot the TRS burst is present in at least four resource elements).

C1. A computer program 1043 comprising instructions 1044 which when executed by processing circuitry 1002 of a UE (e.g. 102) causes the UE to perform the method of any one of the above embodiments.

C2. A carrier containing the computer program of embodiment C1, wherein the carrier is one of an electronic signal, an optical signal, a radio signal, and a computer readable storage medium 1042.

D1. A UE (e.g., UE 102), the UE being adapted to perform the method of any one of embodiments A1-A6 or B1.

D2. A UE (e.g., UE 102), the UE comprising: processing circuitry 1002; and a memory 1042, the memory containing instructions 1044 executable by the processing circuitry, whereby the UE is operative to perform the method of any one of embodiments A1-A6 or B1.

E1. A method 700 (see FIG. 7) performed by a base station (e.g., base station 104, the method comprising: transmitting to a UE (e.g., UE 102) a configuration message (e.g., an RRC Reconfiguration message) that comprises positioning reference signal (PRS) resource configuration information defining a PRS resource configuration (see step s702); transmitting to the UE a trigger message (e.g., MAC CE or DCI) (see step s704), the trigger message comprising information for identifying the PRS resource configuration;

and after transmitting the trigger message, transmitting a PRS according to the PRS resource configuration (see step s706). In some embodiments, the PRS is a semi-persistently or an a-periodically transmitted DL reference signal.

E2. The method of embodiment E1, further comprising: recording a first time value, T1, indicating the time at which the base station transmitted the PRS; receiving a signal transmitted by the UE; recoding a second time value, T2, indicating the time at which the base station received the signal; and calculating either T1–T2 or T2–T1.

E3. The method of embodiment E2, wherein the trigger message triggers the UE to transmit the signal.

E4. The method of embodiment E3, wherein the PRS configuration comprises a pointer to an uplink configuration and the UE is configured to transmit the signal to the base station according to the uplink configuration.

E5. The method of any one of claims E1-E4, wherein the base station configures the UE with the PRS of one transmission and reception point (TRP) only.

E6. The method of claim E5, wherein the one TRP is in the primary serving cell of the UE.

F1. A method 800 (see FIG. 8) performed by a base station (e.g., base station 104), the method comprising: transmitting to a UE (e.g., UE 102) a configuration message (e.g., an RRC Reconfiguration message) that comprises tracking reference signal (TRS) resource configuration information defining a TRS resource configuration (see step s802); transmitting to the UE a trigger message (e.g., MAC CE or DCI) (see step s804), the trigger message comprising information for identifying the TRS resource configuration; and after transmitting the trigger message, transmitting a TRS burst according to the TRS resource configuration (see step s806), wherein in the time domain, the TRS burst is present during at least three different symbols of a first slot, and/or in the frequency domain, the TRS burst has a density of at least 4 for at least the first slot (i.e., in a given symbol of the first slot the TRS burst is present in at least four resource elements).

G1. A computer program 943 comprising instructions 944 which when executed by processing circuitry 902 of a base station (e.g., base station 104) causes the base station to perform the method of any one of embodiments E1-E6 or F1.

G2. A carrier containing the computer program of embodiment G1, wherein the carrier is one of an electronic signal, an optical signal, a radio signal, and a computer readable storage medium 942.

H1. A base station (e.g., base station 104) being adapted to perform the method of any one of embodiments E1-E6 or F1.

H2. A base station (e.g., base station 104) comprising: processing circuitry 902; and a memory 942, the memory containing instructions 944 executable by the processing circuitry, whereby the base station is operative to perform the method of any one of embodiments E1-E6 or F1.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:
    the UE receiving a configuration message that comprises positioning reference signal (PRS) resource configuration information defining a PRS resource configuration;
    the UE receiving a trigger message transmitted by a base station, the trigger message comprising information for identifying the PRS resource configuration;
    after receiving the trigger message, the UE receiving a PRS transmitted by the base station according to the PRS resource configuration;
    the UE recording a first time value (T1) indicating the time at which the UE received the PRS;
    the UE transmitting a signal to the base station;
    the UE recording a second time value (T2) indicating the time at which the UE transmitted the signal; and
    the UE calculating either T1–T2 or T2–T1, wherein
    the PRS is a semi-persistently or an a-periodically transmitted downlink (DL) reference signal.

2. The method of claim 1, wherein the information included in the trigger message is indicative about to activate and/or de-activate the PRS resource configuration.

3. The method of claim 2, wherein after the activation, the PRS is to be received for a configurable time period.

4. The method of claim 1, wherein
    the PRS resource configuration information is received by means or Radio Resource Control, RRC, signalling, and
    the trigger message is a MAC control element (CE).

5. The method of claim 4, wherein the MAC CE indicates a serving cell identifier (ID), a TRP ID within the serving cell, and a PRS Resource Set ID within the TRP.

6. The method of claim 5, wherein the MAC CE further comprises a bit information indicative if the PRS resource configuration is to be activated or de-activated.

7. The method of claim 1, further comprising the UE transmitting the signal to the base station as a result of receiving the trigger message.

8. The method of claim 7, wherein
    the PRS configuration comprises a pointer to an uplink (UL) configuration, and
    the UE transmits the signal to the base station according to the UL configuration.

9. The method of claim 1, wherein the UE is configured with the PRS of one transmission and reception point (TRP) only.

10. The method of claim 9, wherein the TRP is in the primary serving cell of the UE.

11. A user equipment (UE), the UE comprising:
    a receiver for receiving:
    i) a configuration message that comprises positioning reference signal (PRS) resource configuration information defining a PRS resource configuration;
    ii) a trigger message transmitted by a base station, the trigger message comprising information for identifying the PRS resource configuration; and
    iii) a PRS transmitted by the base station according to the PRS resource configuration, wherein
    the PRS is a semi-persistently or an a-periodically transmitted DL reference signal, and
    the PRS is transmitted by the base station after the base station transmits the trigger message, and
    the UE is configured to:

record a first time value (T1) indicating the time at which the UE received the PRS;

transmit a signal to the base station;

record a second time value (T2) indicating the time at which the UE transmitted the signal; and calculate either T1–T2 or T2–T1.

12. A method performed by a base station, the method comprising:

transmitting to a user equipment (UE) a configuration message that comprises positioning reference signal (PRS) resource configuration information defining a PRS resource configuration;

transmitting to the UE a trigger message, the trigger message comprising information for identifying the PRS resource configuration;

after transmitting the trigger message, transmitting a PRS according to the PRS resource configuration;

recording a first time value, T1, indicating the time at which the base station transmitted the PRS;

receiving a signal transmitted by the UE;

recording a second time value, T2, indicating the time at which the base station received the signal transmitted by the UE; and calculating either T1–T2 or T2–T1, wherein the PRS is a semi-persistently or an a-periodically transmitted DL reference signal.

13. The method of claim 12, wherein the information included in the trigger message is indicative about to activate and/or de-activate the PRS resource configuration.

14. The method of claim 12, wherein the resource configuration information comprises an information about a configurable time period to receive the PRS after the activation.

15. The method of claim 12, wherein the PRS resource configuration information is received by means or Radio Resource Control (RRC) signalling, and wherein the trigger message is a MAC control element (CE).

16. The method of claim 15, wherein the MAC CE indicates a serving cell identifier (ID), a TRP ID within the serving cell, and a PRS Resource Set ID within the TRP.

17. The method of claim 16, wherein the MAC CE further comprises a bit indicative if the PRS resource configuration is to be activated or de-activated.

18. The method of claim 12, wherein the trigger message triggers the UE to transmit the signal.

19. The method of claim 18, wherein the PRS configuration comprises a pointer to an uplink (UL) configuration and the UE is configured to transmit the signal to the base station according to the UL configuration.

20. A base station, the base station comprising:

memory;

processing circuitry;

a receiver; and a transmitter, wherein the base station is configured to:

transmit to a user equipment (UE) a configuration message that comprises positioning reference signal (PRS) resource configuration information defining a PRS resource configuration;

transmit to the UE a trigger message, the trigger message comprising information for identifying the PRS resource configuration;

after transmitting the trigger message, transmit a PRS according to the PRS resource configuration;

record a first time value, T1, indicating the time at which the base station transmitted the PRS;

record a second time value, T2, indicating the time at which the base station received a signal transmitted by the UE; and calculate either T1–T2 or T2–T1, wherein the PRS is a semi-persistently or an a-periodically transmitted DL reference signal.

\* \* \* \* \*